(12) United States Patent　　　　(10) Patent No.:　　US 9,557,458 B2
　　Lutolf et al.　　　　　　　　　　　(45) Date of Patent:　　　Jan. 31, 2017

(54) OPTICAL GRATING COUPLING STRUCTURE

(71) Applicant: CSEM CENTRE SUISSE D'ELECTRONIQUE ET DE MICROTECHNIQUE SA-RECHERCHE ET DEVELOPPEMENT, Neuchâtel (CH)

(72) Inventors: Fabian Lutolf, Magden (CH); Martin Stalder, Oberwil (CH); Guillaume Basset, Huningue (FR)

(73) Assignee: CSEM Centre Suisse d'Electronique et de Microtechnique SA—Recherche et Développement, Neuchâtel (CH)

( * ) Notice: Subject to any disclaimer, the term of this patent is extended or adjusted under 35 U.S.C. 154(b) by 0 days.

(21) Appl. No.: 15/031,597

(22) PCT Filed: Oct. 29, 2013

(86) PCT No.: PCT/EP2013/072659
§ 371 (c)(1),
(2) Date: Apr. 22, 2016

(87) PCT Pub. No.: WO2015/062641
PCT Pub. Date: May 7, 2015

(65) Prior Publication Data
US 2016/0274281 A1　　Sep. 22, 2016

(51) Int. Cl.
　　*G02B 6/10*　　(2006.01)
　　*G02B 5/18*　　(2006.01)
　　*G02B 6/34*　　(2006.01)
(52) U.S. Cl.
　　CPC ......... *G02B 5/1866* (2013.01); *G02B 5/1852* (2013.01); *G02B 6/34* (2013.01)

(58) Field of Classification Search
　　USPC .................................................. 385/131–132
　　See application file for complete search history.

(56) References Cited

U.S. PATENT DOCUMENTS

| 5,080,465 A | 1/1992 | Laude |
| 8,730,575 B2 * | 5/2014 | Kaida .................. G02B 5/3058 359/485.05 |

(Continued)

FOREIGN PATENT DOCUMENTS

| WO | 2006/064301 A1 | 6/2006 |
| WO | 2012/162880 A1 | 12/2012 |

OTHER PUBLICATIONS

Amitai, Y., et al., "Design of Wavelength-Division Multiplexing/Demultiplexing Using Substrate-Mode Holographic Elements," Optics Communications 98(1-3):24-28, Apr. 1993.

(Continued)

*Primary Examiner* — Eric Wong
(74) *Attorney, Agent, or Firm* — Chistensen O'Connor Johnson Kindness PLLC

(57) ABSTRACT

The invention relates to a grating coupler comprising: —an optical substrate arranged to transfer a light beam, and —a diffraction grating arranged on, or imbedded in, the surface of said optical substrate, said diffraction grating comprising diffraction grating elements comprising each a coating arranged asymmetrically on said diffraction grating elements. The grating coupler is further arranged to satisfy the condition: $(n1 \times \sin(|\alpha|) + \eta 2)/\lambda \times P > 1$, wherein n1 is the refractive index of the optical medium to the incident light side of the diffraction grating elements, n2 is the refractive index of the optical medium to the diffracted light side of the diffraction grating elements, lal the absolute value of the incident angle of the light beam incident on the grating (Continued)

coupler λ is the vacuum wavelength of the diffracted light, and P is the period of the diffraction grating elements.

24 Claims, 23 Drawing Sheets

(56) References Cited

U.S. PATENT DOCUMENTS

| | | | |
|---|---|---|---|
| 2003/0180024 A1* | 9/2003 | Edlinger | B01D 21/0012 |
| | | | 385/132 |
| 2004/0062502 A1 | 4/2004 | Levola | |
| 2005/0078374 A1 | 4/2005 | Taira et al. | |

OTHER PUBLICATIONS

International Preliminary Report on Patentability mailed Jan. 27, 2016, issued in corresponding International Application No. PCT/EP2013/072659, filed Oct. 29, 2013, 17 pages.

International Search Report mailed Jul. 9, 2014, issued in corresponding International Application No. PCT/EP2013/072659, filed Oct. 29, 2013, 3 pages.

* cited by examiner

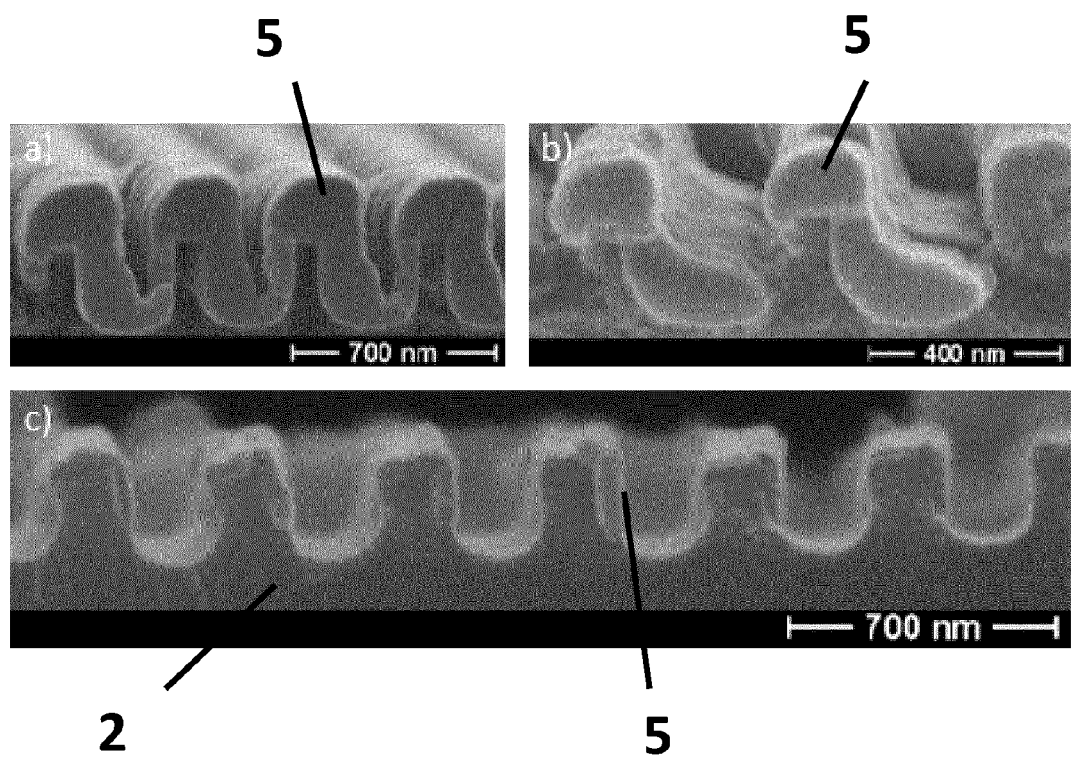
FIG.4 a,b,c

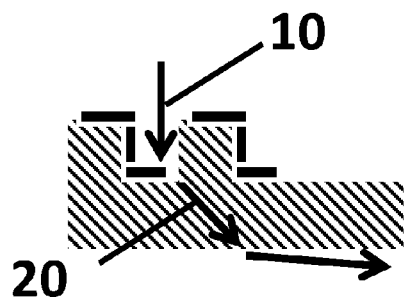
FIG.5a
FIG.5b
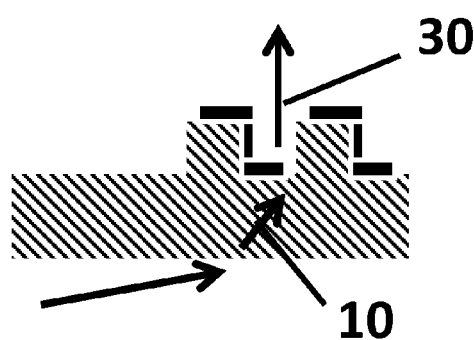
FIG.5c
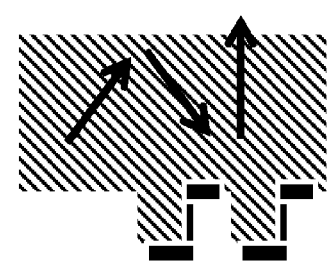
FIG.5d
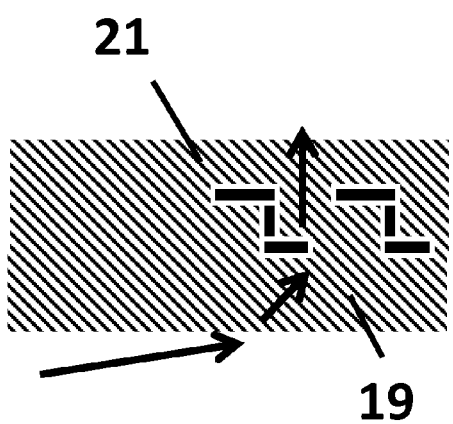
FIG.5e
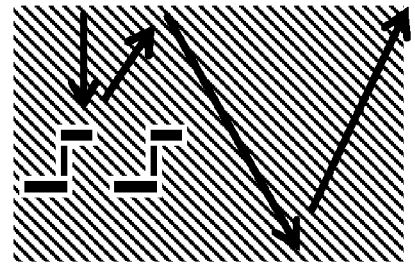
FIG.5f
FIG.5

OPTICAL GRATING COUPLING STRUCTURE

TECHNICAL FIELD

The present invention relates to optical dispersive structures and the like to couple light into or out of an optical medium. More specifically, the invention relates to diffractive structures and the like, arranged on these optical mediums, and intended to be used as light couplers in optical instruments, optical sensors and optical devices.

BACKGROUND OF THE INVENTION

Gratings are very important building blocks in various optical systems. They are implemented in a wide field of applied optics and industrial applications. A great number of modern optical devices and systems implement all kinds of optical gratings since many photo spectroscopic devices, lasers, solar modules and systems, optical waveguides, wave filters, optical sensors, rely on the efficient redirection of light as a function of the wavelength of that light. Diffraction gratings may be used as a device to change the angle of an incident beam, to separate light in its different spectral components, to mix beams with different wavelengths such as in a telecom multiplexer or to filter a part of the spectrum of a light beam such as in a monochromator or spectrometer.

Diffraction gratings find also more and more applications in security devices and in display applications. They can also be found in fiber optical sensors, for example in the form of distributed Bragg gratings. For polarisation applications as well as applications using the interaction of plasmons with photons, metallic gratings have also been widely considered.

Numerous basic publications in the literature focus on the physics, the fabrication technologies and the applications of gratings such as:
M. Born and E. Wolf, "Principles of Optics", Pergamon Press, Oxford, 1993.
R. Petit, "Electromagnetic Theory of Gratings", R. Petit, ed. Springer Verlag, berlin 1980.
M. Schnieper et al., "Application and fabrication of sub-wavelength gratings" in Diffractive Optics and Micro-optics, Technical Digest (Optical Society of A. Erica, Tucson 2002), p. 228-230.

Many publications exist that describe how to improve the efficiency of gratings and grating structures, how to miniaturise and fabricate them and since two decades a lot of effort has also been put in the development of replication methods of grating structures.

The standard approach to redirect light by the diffraction effect is by the use of periodic microstructures such as linear shaped microgrooves fabricated on the surface of a glass or metallic surface. More than a century ago the first gratings were simple groove shaped lines and were realised by diamond scribing techniques requiring huge and complicated mechanical machines. Today these microgrooves can be fabricated by a wide variety of techniques, such as diamond machining, etching, nanoimprint or deposition techniques, and by modern technology complicated shapes of the grooves may be realised, such as multilevel diffractive optical elements or DOE's. It has been a constant trend to improve gratings by developing new shapes, new arrangements of gratings and by using special materials having specific properties such as the index of refraction or the combination of different materials so as to obtain special optical effects with the gratings.

In order to improve the efficiency of the diffraction of light by a grating, asymmetric grating profiles of substantially linear shaped grooves have been considered in the past, with cross sections (i.e. perpendicular to the groove line) of the grating elements having a shape such as saw-tooth-, slanted-, binary blazed- or multilevel step shape. The shape of the grating structures that diffract light are in general optimized for a specific incidence angle of the light impinging on the grating, most common a normal incidence angle, and one preferred diffraction order, typically the first or second diffraction order, although higher orders can be considered also such as in an echelle grating wherein the diffraction order can be very high, for example 30 or 80. For low order diffraction effects the efficiency can be achieved by making a blazed-type diffraction grating, which is designed, to have a substantial trapezoidal shaped grating element cross sections, inclined surfaces of which, with respect to the normal incidence angle to the grating, are arranged so as to diffract light in a specific predetermined direction. All of the above mentioned gratings however are either challenging or costly to fabricate or to replicate.

The diffraction efficiency is a parameter that is constantly improved as a particular diffraction order is used, and the rest of the transmitted, scattered or diffracted light is mostly perturbing light for the system. So, one seeks constantly to improve the diffraction efficiency. A fundamental reason for the limitation of the diffraction efficiency for a specific order, for example the first diffraction order, is related to the fact that when light incident perpendicularly on a symmetric diffraction grating is diffracted, at most 50% of the diffracted light can be directed to for instance the first positive and the first negative diffraction order each, for symmetry reasons. Although blazed type transmission gratings enhance considerably the diffraction efficiency for a specific wavelength, a difficulty arises when dealing with multi-color light, such as in displays, because the diffraction efficiency of the other wavelengths is reduced. In transmission diffraction gratings a fraction of the light is transmitted in the zero-order, which in most applications is a source of undesirable light, reducing contrast or leading to perturbations of signals in sensors. Accordingly, to enhance the diffraction efficiency, it is desirable to reduce zero-order transmitted light.

A structure that reduces the zero order transmitted light of gratings is disclosed in US 2005/0078374 wherein a partial metallisation of the grating element reduces the zero order light. The disclosed structure uses blazed type grating structures, which are difficult to fabricate and reproduce. The structure disclosed in US 2005/0078374 still has a basic limitation in the diffraction orders other than the zero order.

More specifically, gratings may be used to couple light efficiently into a waveguide or a window. Different grating structures have been proposed such as blazed gratings to improve the light coupling in optical waveguides, such as in WO 2010/122329 wherein blazed grating elements are provided on the surface of the waveguide. As the grating elements are blazed, their realisation is difficult and the diffraction efficiency stays limited by the above-mentioned fundamental limitations.

In other approaches to enhance the light coupling by grating couplers in a waveguide dielectric coatings have been used on the grating elements.

Other methods have been proposed to improve the light-coupling efficiency of binary, non-blazed, gratings such as described by S. Siitonen et al in their article "A double-sided grating coupler for thin waveguides", Opt. Express 2007, Mar. 5, 15(5), 2008-18.

Although crossed binary gratings, arranged on opposite sides of a thin waveguide, improve the light coupling efficiency in the waveguide, the solutions is still of limited use as the crossed gratings have to be arranged on the two sides of a thin waveguide, and the solution would not be possible for a thick waveguide and certainly not for a window. Also, it requires a more complicated, and thus more expensive, solution than using a binary grating arranged on one side of a waveguide.

Another method to couple light efficiently in a waveguide is to arrange a Bragg grating arranged along a waveguide so as to enhance the coupling efficiency in the waveguide. Such a method is described in U.S. Pat. No. 4,737,007. Although the proposed structure improves the incoupling efficiency in a waveguide, its application is limited to thin waveguides as it is based on interference effects and guided mode resonances. Their approach would not be suited to enhance considerably the incoupling efficiency in a waveguide or optical window in which there is no distributed interaction between the grating structure and the diffracted light by that type of grating structure. Also, the incoupling efficiency enhancement in the structure proposed by U.S. Pat. No. 4,737,007 is limited to a narrow wavelength band, i.e. some angstroms.

SUMMARY OF THE INVENTION

The object of this invention is to overcome at least partially the limitations of optical grating couplers of prior art. More specifically the invention relates to a grating coupler comprising:

an optical substrate arranged to transfer a light beam, and
a diffraction grating arranged on, or imbedded in, the surface of said optical substrate, said diffraction grating comprising diffraction grating elements arranged substantially in the plane A of said diffraction grating, said diffraction grating elements defining for each cross section thereof, a normal B to said plane A, said normal B separating said cross section into two substantially symmetrical portions, and said normal B further dividing said diffraction grating elements in a first side (FS) and a second side (SS), said first side (FS) being situated substantially in the proceeding direction of the propagating order of the diffracted light beam having the highest intensity, transferred from the diffraction grating, said second side (SS) being oriented opposite to said proceeding direction.

The diffraction grating elements comprise a coating that is arranged asymmetrically on said diffraction grating elements. A major portion of said coating is arranged either to said first side (FS), or to said second side (SS), and the grating coupler is further arranged to satisfy the condition:

$(n1 \times \sin(|\alpha|) + n2)/\lambda \times P \geq 1$, wherein n1 is the refractive index of the optical medium to the incident light side of the diffraction grating elements,
n2 is the refractive index of the optical medium to the diffracted light side of the diffraction grating elements,
$|\alpha|$ the absolute value of the incident angle of the light beam incident on the grating coupler,
$\lambda$ is the vacuum wavelength of the diffracted light, and
P is the period of the diffraction grating elements.

In a preferred embodiment the asymmetric coating is a dielectric coating.

The materials of the dielectric coating of the grating coupler are chosen among materials having an index of refraction higher than 1.4 for wavelengths between 0.2 µm and 2 µm. Preferably the dielectric coating materials are chosen among: ZnS, or $TiO_2$, or $HfO_2$, or $Ta_2O_5$, or $ZrO_2$, or AlN, or $Al_2O_3$, or ZnO, or $SiO_2$, or $Si_3N_4$, or $MgF_2$, or $CaF_2$, or MgO. The dielectric coating may be a multilayer dielectric coating. An arrangement of a multilayer dielectric coating allows to improve further the design flexibility of the grating coupler and so the light coupling efficiency of that grating coupler.

In a variant a portion of the dielectric coating may comprise a portion on which a metal coating or a semiconductor coating, or a combination of these two coatings, is arranged. The dielectric coating may also comprise a portion wherein the dielectric material is replaced by a metal coating or a semiconductor coating or a combination of these. The materials for the dielectric coating are easily available and can be deposited at low cost in a high throughput production line such as roll to roll processing. In a variant a metallic or semiconductor asymmetric coating may be arranged on the dielectric asymmetric coating.

In a variant the asymmetric coating may be a metallic coating or a semiconductor coating or may be an asymmetric coating comprising a metal and a semiconductor. In another variant a dielectric asymmetric coating may be arranged on said metallic or semiconductor asymmetric coating. In yet another variant a first asymmetric dielectric, metallic or semiconductor coating may be arranged to the first side (FS) of the diffraction grating elements and a second asymmetric coating, comprising a different material than said first asymmetric coating, may be arranged to the second side (SS) of the diffraction grating elements.

According to the invention it has been identified and proven, theoretically and experimentally by the inventors of the current application that, when arranging an asymmetrical dielectric coating on symmetric diffraction grating elements of a grating coupler, coupling efficiencies higher than 50% can be obtained for the first or second diffraction order of light coupled in or out a waveguide or window even at perpendicular incidence. In the past it has been acknowledged that a symmetric diffraction grating may couple at most 50% light into a first or second diffraction order at perpendicular incidence and for light beams having a symmetric solid angle distribution around the normal of the grating because there is always a first and second diffraction order in which substantially the same intensity of light is coupled into the first and second diffraction orders with opposite signs. Therefore, coupling efficiencies in a specific positive or negative diffraction order are never higher than 50%.

In an embodiment the optical substrate to which the grating coupler is arranged is a waveguide, arranged to guide an incoupled light beam, coupled by the grating coupler, in the waveguide.

In another embodiment, the optical substrate on which the grating coupler is arranged may also be an optical window, "window" meaning any type of transparent optical material having a thickness substantially greater than the wavelength of the coupled light into or out of said window. The grating coupler arranged on a window is arranged to transfer, through the window, an incoupled light beam in that window, by the grating coupler.

The grating coupler may be arranged on the surface of the optical substrate but may also be arranged inside the optical substrate. The grating coupler may be arranged substantially near to the surface of the optical substrate, but may also be imbedded inside the optical substrate. The grating coupler may be arranged to the side of the optical window opposite to the incident light side. The grating coupler may be arranged as an input coupler or an output coupler. By definition the wording "output coupler", or equivalently "outcoupler", is used when the incident light on said output coupler is transmitted from an optical dense medium to a less dense optical medium.

The wording "input coupler", or equivalently "incoupler", is used in all other cases.

Furthermore, the input coupler may be a reflection type grating coupler wherein an incident light beam on said input coupler is reflected and diffracted substantially in one of the positive or one of the negative diffraction orders.

The optical substrate material of the optical waveguide or window substrate is a material transparent for wavelengths between 200 nm and 10 µm, preferably between 350 nm and 3 µm.

In a preferred embodiment the grating coupler comprises grating elements that are substantially elongated elements distributed periodically in the proceeding direction of a light beam transferred from the diffraction grating and wherein the grating elements are binary grating elements. These binary grating elements are easy to fabricate and to replicate, allowing, by arranging an asymmetric coating on the binary grating elements, to realize low cost grating couplers having efficiencies similar to blazed gratings couplers.

According to different embodiments the grating coupler may comprise diffraction grating elements that have a substantially rectangular, triangular, sinusoidal, cycloidal, trapezoidal, staircase or semi-circular cross section, said cross section being defined in the direction of the propagating lightbeam. The possibility to adapt different shaped cross sections allow for a greater design flexibility of the grating coupler and so a greater flexibility in the adaptation of the required coupling efficiency in function of the wavelengths, the diffraction order and the geometry of the specific optical application. Grating couplers may comprise at least two portions of diffraction grating elements that have different shaped cross sections.

In an embodiment, the diffraction grating elements of the grating coupler are arranged as a 2-dimensional array of diffraction grating elements, arranged in the plane of said diffraction grating.

The grating coupler may have refractive and diffractive properties at the same time. Combining refractive properties with the diffractive properties of the grating coupler allows more functionality in the design of optical devices using the grating couplers. For example a grating coupler may be arranged on a curved surface, allowing a wider design flexibility of an optical system using such a grating coupler.

The grating coupler may comprise diffraction grating elements wherein the period of the diffraction grating elements are in the order of the wavelength of the incident light wave on the grating elements, said diffraction grating elements being arranged to allow substantially only a specific diffraction order in the light interaction with said diffraction grating elements. The diffraction grating elements of the grating coupler may be subwavelength structures.

In a preferred embodiment the specific diffraction order for which the coupling efficiency of the grating coupler is optimized is the first negative or the first positive diffraction order. This allows to arrange the grating coupler in a variety of optical devices requiring a highly efficient dispersion effect under a reasonably high angle.

In another embodiment the specific diffraction order for which the coupling efficiency of the grating coupler is optimized is the second negative or the second positive diffraction order. This allows using the grating coupler in typical arrangements needed for most optical devices requiring a good efficient dispersion effect under a higher angle than the one that can be obtained by a coupling into the first positive or negative diffraction order.

The grating coupler may be optimized for the first positive or the first negative diffraction order or for the second positive or the second negative diffraction order. The grating coupler may be designed also for coupling into higher order diffraction orders, which may be useful in the case of for example optical devices requiring specific optical configurations in which a high angle is needed for the incoupled or outcoupled light.

The invention relates further also to a light coupling system, comprising:
an optical substrate to transfer a light beam,
a grating coupler, as described above, arranged on said optical substrate to incouple a light beam incident on said grating coupler into said optical substrate,
a grating coupler according to the invention, arranged on said optical substrate to outcouple a light beam incident on said grating coupler out of said optical substrate.

The optical substrate of the light coupling system may be a window or may be a waveguide.

The invention relates also to a method for optimizing the coupling efficiency of the coupled light by the grating coupler described above, comprising at least the steps of:
choosing the geometry, the dimension and the materials of the substrate, diffraction grating and diffraction grating elements;
determining the incidence angle of the incident light beam and the solid angle intensity distribution of the incident light beam onto the diffraction grating;
determining the wavelength range and intensity distribution of the incident light beam on the grating coupler;
determining the desired diffraction order and the angle of the diffracted light incident on the grating coupler;
determining the period of the diffraction grating elements;
determining the materials of the asymmetric coating;
choosing raw values for a set of parameters for the asymmetric coating, said parameters comprising the coverage distribution, deduced by the main evaporation angle of the material to be deposited on the diffraction grating elements, and thickness of the coating arranged on the diffraction grating elements;
proceeding to an optical coupling simulation step, by using an iteration algorithm, to determine the optimized set of parameters, said simulation step being performed to maximize the coupling efficiency of the incident light beam on said diffraction grating, crossing said diffraction grating, said step being performed for the first or the second diffractive order of the light beam diffracted by said diffraction grating.

The invention relates further to a method for diffracting a light beam incident on a diffracting element with a diffraction efficiency higher than 50%, in the visible wavelength range, for any incidence angle on the diffraction element, into one of the positive or negative diffraction orders, said diffraction being performed by the grating coupler of the invention, as described above, the grating coupler being arranged between a first and a second optical medium. Said first and second optical medium may be the same optical medium.

Said first optical medium may also have a lower refractive index than the refractive index of said second optical medium. In such a case, the method allows to propagate an incident light beam in said first optical medium before being diffracted by said grating coupler into said second optical medium. In this embodiment, the grating coupler is used as an incoupler, also called input coupler.

In another embodiment the method allows to propagate an incident light beam in said second optical medium before being diffracted by said grating coupler into said first optical medium. This embodiment of the method allows to use the grating coupler as an outcoupler, also called output coupler.

Said first optical medium and said second optical medium may have the same index of refraction, or may be the same material. In such a case the method allows to propagate a light beam in said optical medium and to diffract the lightbeam incident on said grating coupler into said optical mediums, by crossing the grating coupler. In this embodiment the method allows to change the direction of light propagating inside an optical medium or inside an optical substrate having at least a first and a second optical medium having the same index of refraction. This embodiment of the method is useful to change the direction of a propagating light inside an optical medium.

When the first optical medium and the second optical medium have the same index of refraction or are the same material, the method allows to change the direction of a propagating light beam in the optical mediums by reflection diffraction on the grating coupler. This embodiment of the method is useful to change the direction of a propagating light beam inside an optical medium so that the propagating light beam is propagated, after reflection diffraction by the grating coupler, in the optical medium to the same side as the incident light side of the grating coupler.

Finally, the invention relates to the use of a grating coupler as described in the invention.

BRIEF DESCRIPTION OF THE DRAWINGS

The above described objects and advantages of the present invention will become more readily apparent to those ordinarily skilled in the art after reviewing the following detailed descriptions and accompanying drawings, in which:

FIG. 3b illustrates the transmission efficiency of the first diffracted order in function of the wavelength for the diffraction grating element of FIG. 3a;

FIGS. 5 g, h, i, j illustrate the arrangement of at least two grating couplers on an optical substrate;

FIG. 5 k, l illustrate a grating coupler comprising two grating couplers;

DETAILED DESCRIPTION

Figure 1A:
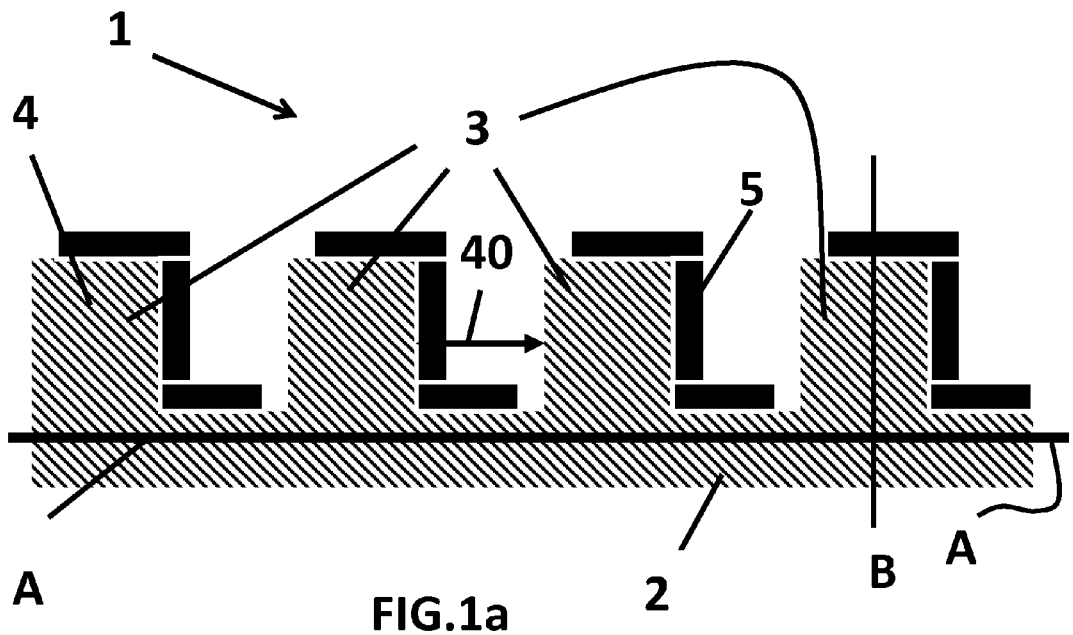
FIG. 1a illustrates a cross section of a grating coupler comprising diffraction grating elements on which an asymmetric coating is arranged.

The following detailed description illustrates the principles and examples of embodiments according to the invention. It will thus be appreciated that those skilled in the art will be able to devise various arrangements that, although not explicitly described or shown herein, embody the outlined principles of the invention and are included in its scope as defined in the claims. In the description and the figures, similar reference signs refer to the same or similar components or structural elements. Also, the wording "transparent" as used herein the description encompasses an average transparency of a light beam of at least 70%, in the wavelength range of interest. The wording "visible" as used herein means light between the near-UV to the near-infrared, i.e. between 300 nm-2 µm as such wavelength can be converted easily to light visible for the human eye. Also, with the wording "waveguide" is meant an optical waveguide.

According to the invention it has been identified and demonstrated, theoretically and experimentally by the inventors of the current application that, when arranging an asymmetrical dielectric, metallic or semiconductor coating on the symmetric diffraction grating elements of a grating coupler, coupling efficiencies higher than 50% can be obtained for the first or second diffraction order of light coupled in or out a waveguide or window at any angle of incidence. With the wording waveguide is meant an optical substrate in which the light is transmitted by multiple internal reflections from one portion of the waveguide to another portion. A waveguide according to the invention may be a multimode waveguide having a uniform diameter or may be a tapered waveguide. With window is meant an optical substrate essentially used to transmit the light from one side to another side of the optical substrate, either without any internal reflection or in some cases by at least two internal reflections. A window may have waveguiding properties. A window may comprise different transparent layers. In the past it has been acknowledged that a symmetric diffraction grating may couple at most 50% light into a positive or negative first or second diffraction order at perpendicular incidence, and for light beams having a solid angle distribution that is symmetric to the normal of the diffraction grating because there is always a same diffraction order of the opposite sign in which substantially the same intensity of light is coupled.

More specifically, the invention relates to high efficiency grating couplers comprising a diffraction grating 3 comprising diffraction grating elements 4 on which an asymmetrical coating is arranged, which allows to realize and replicate such optical couplers at very low cost. It is a main achievement of the invention to obtain coupling efficiencies higher than 50% for a specific positive or negative diffraction order, preferably the first or the second diffraction order, with a grating coupler 1 comprising symmetrically shaped diffraction grating elements 4 that are easy and inexpensive to realize and to replicate. The grating coupler 1 of the invention allows achieving high coupling efficiency for a wide wavelength range. The grating coupler of the invention may be used as very useful dispersive optical elements in optical systems and devices.

Figure 1B:
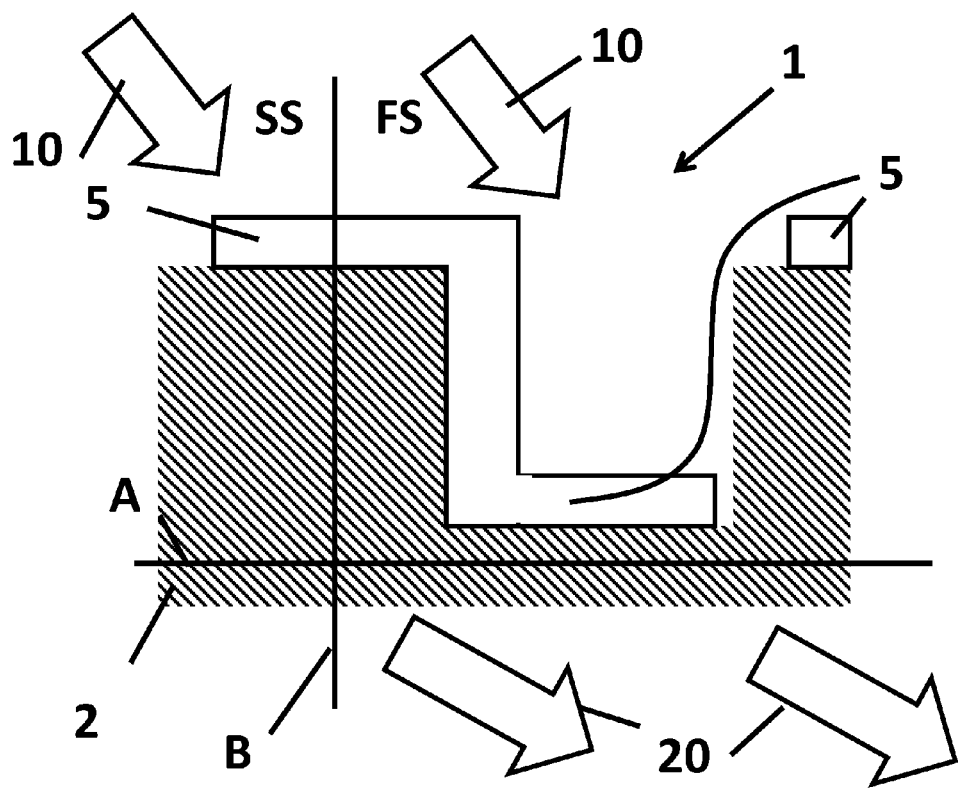
FIG. 1b illustrates a first side and a second side of a diffraction grating element on which an asymmetric coating is arranged, as well as a reference plane A of the diffraction grating element and a normal B to that reference plane A.

According to a preferred embodiment of the invention, illustrated in FIG. 1a and FIG. 1b, a grating coupler 1 comprises:
- an optical substrate 2 arranged to transfer a light beam 10 and,
- a diffraction grating 3, comprising periodically arranged binary diffraction grating elements 4, arranged on, or imbedded in, the surface of said optical substrate 2-
- an asymmetric dielectric coating 5 arranged on the binary diffraction grating elements 4.

The binary grating elements 4 of said grating coupler 1 are arranged substantially in the plane A of the substantially flat diffraction grating 3.

Figure 1C:
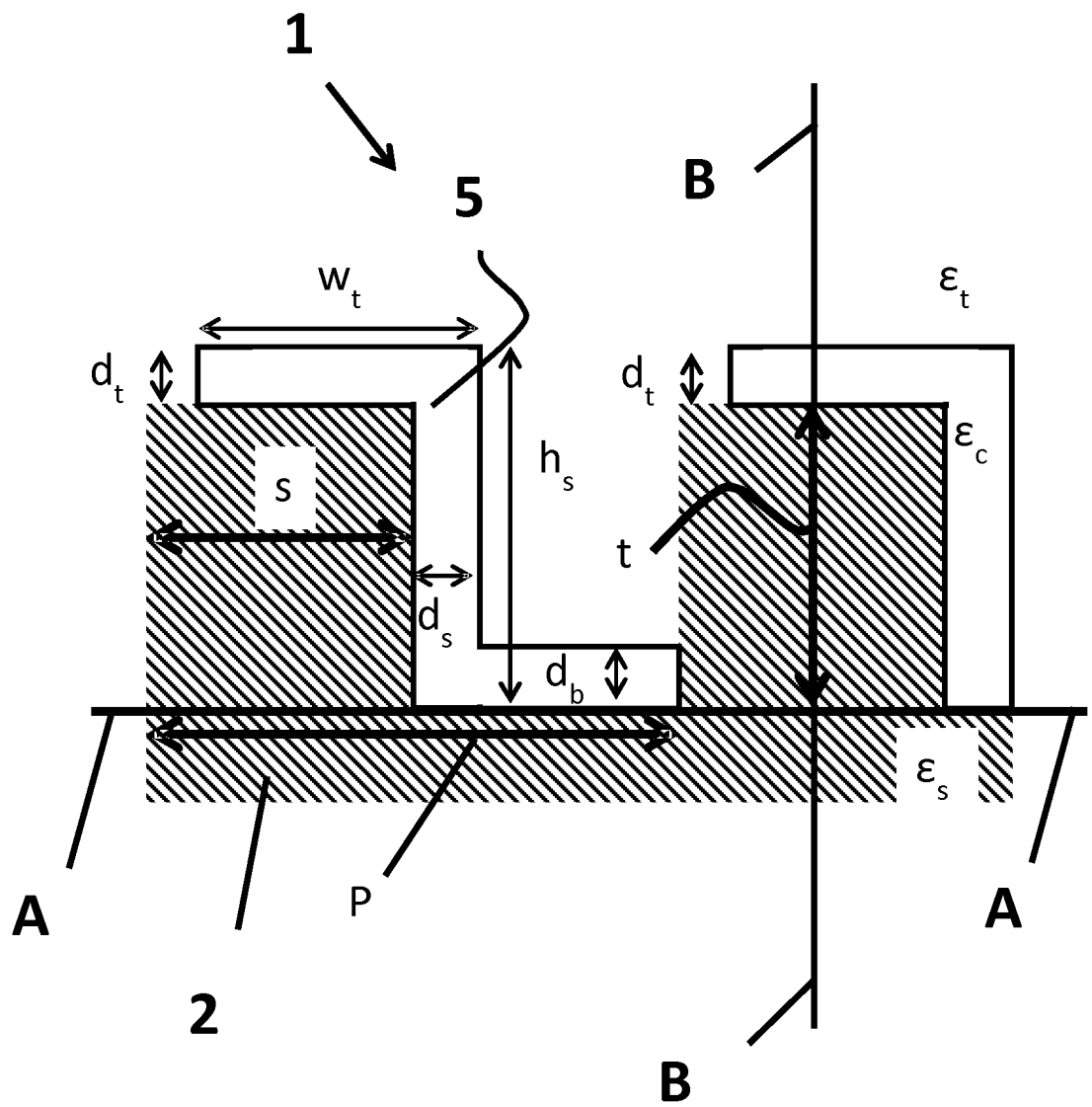
FIG. 1c illustrates the geometrical parameters of the cross section of a diffraction grating element of FIG. 1a comprising an asymmetrical coating.
Figure 1D:
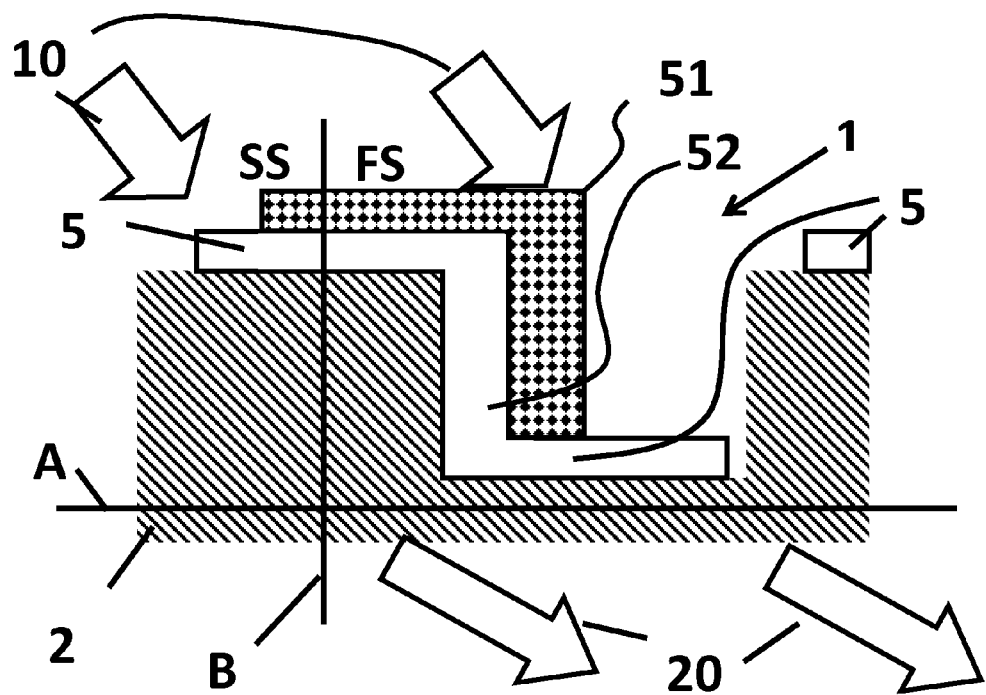
FIG. 1d illustrates a grating coupler on which an asymmetric coating is arranged comprising different coating portions.
Figure 1E:
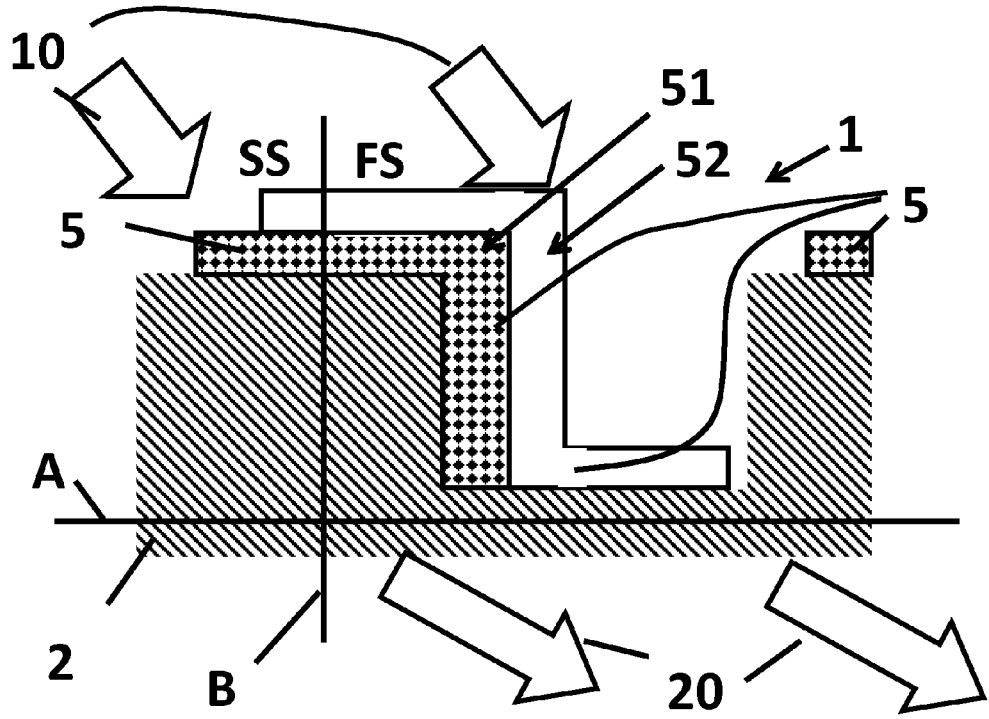
FIG. 1e illustrates another grating coupler on which an asymmetric coating is arranged comprising different coating portions.
Figure 1F:
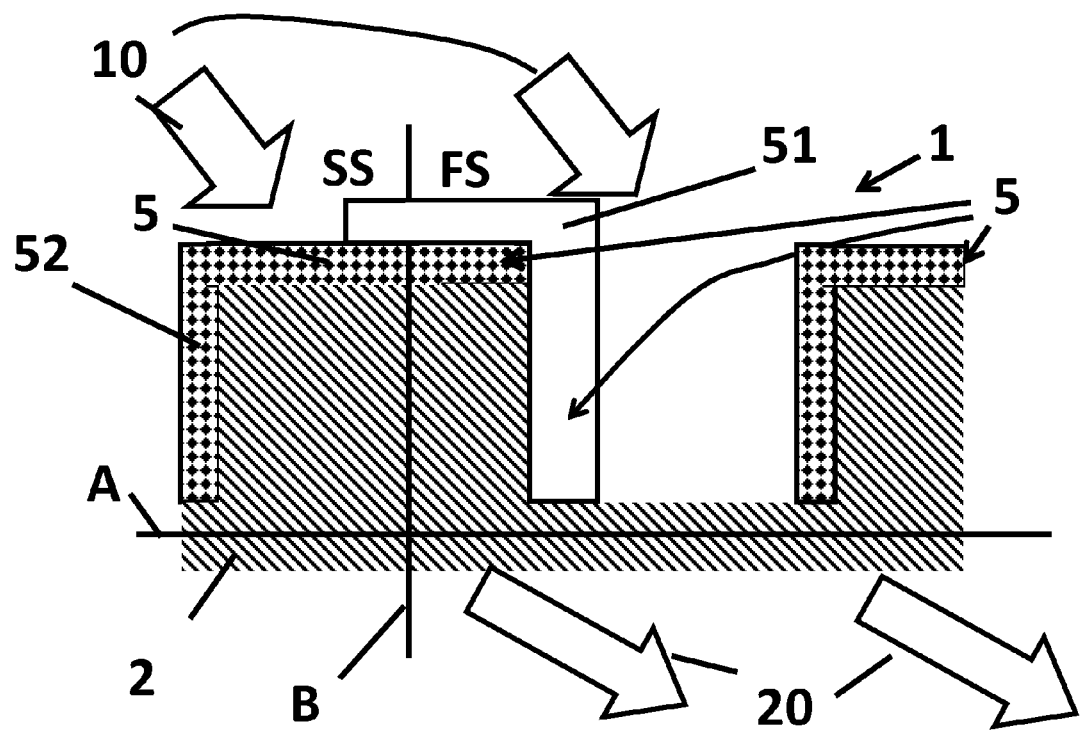
FIG. 1f illustrates another grating coupler of which the first side and the second side of the diffraction grating elements comprise each an asymmetric coating.

Each binary grating element 4 defines for each cross section thereof, a normal B to said plane A, this normal B separates said cross section into two substantially symmetrical portions, and said normal B divides further the diffraction grating elements 4 in a first side (FS) and a second side (SS), said first side (FS) being situated substantially in the proceeding direction of the propagating order of the diffracted light beam having the highest intensity, transferred from the diffraction grating, and said second side (SS) is oriented opposite to said proceeding direction, as illustrated in FIG. 1c. Each of the binary grating elements 4 of the grating coupler 1 of the preferred embodiment comprises an asymmetric dielectric coating 5. This asymmetric dielectric coating 5 is arranged asymmetrically on each of the diffraction grating elements 4 to the side of the incident light beam 10, and the major portion of said dielectric coating 5 is either arranged to said first side FS or to the second side SS. The material of the asymmetric dielectric coating 5 is preferably chosen among materials having an index of refraction higher than 1.4 for wavelengths between 0.2 μm and 2 μm, and are preferably chosen among the following materials: ZnS, or TiO$_2$, or HfO$_2$, or Ta$_2$O$_5$, or ZrO$_2$, or AlN, or Al$_2$O$_3$ or ZnO, or SiO$_2$, or Si$_3$N$_4$, or MgF$_2$, or CaF$_2$, or MgO or any combination of these. The asymmetric coating may comprise a first portion 51 and a second portion 52. One of the said first 51 and second 52 portions may be a dielectric and the other portion may be a metal or a semiconductor, and both said portions 51, 52 may have a different geometry, as illustrated in FIG. 1d and FIG. 1e. The asymmetric dielectric coating 5 may be a multilayer dielectric coating. In another variant, illustrated in FIG. 1f, at least a first 51 asymmetric dielectric, metallic or semiconductor coating may be arranged to the first side (FS) of the diffraction grating elements and at least a second 52 asymmetric coating, comprising a different material than said first asymmetric coating, may be arranged to the second side (SS) of the diffraction grating elements.

Figure 2A:
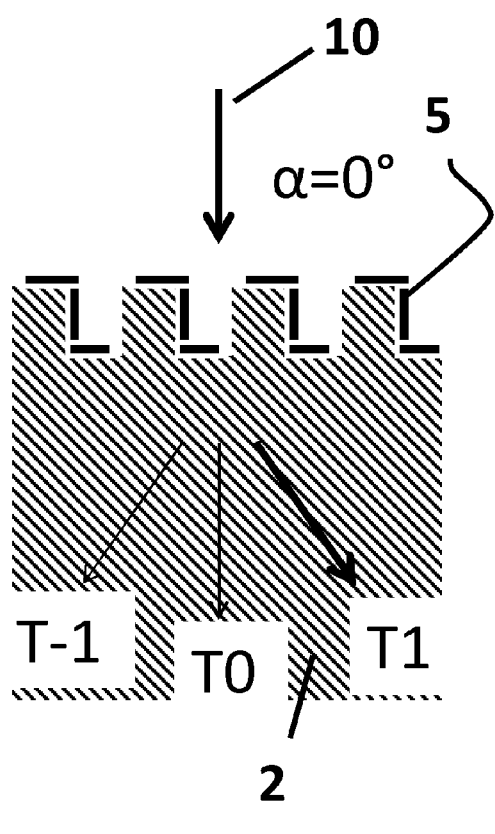
FIG. 2a illustrates a light beam incident perpendicularly on a grating coupler comprising an asymmetrical coating, and the incoupled intensity of the zero and first transmitted orders obtained by that grating incoupler into a waveguide or a window.
Figure 2B:
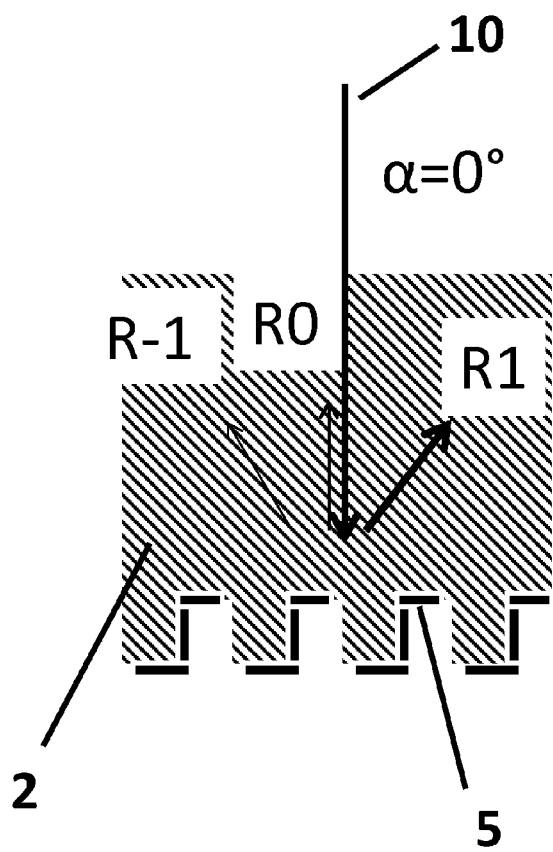
FIG. 2b illustrates a light beam propagated in a window or waveguide and incident perpendicularly on a grating coupler comprising an asymmetrical coating, and shows the incoupled intensity of the zero and first positive and negative reflected orders obtained by that grating coupler.

The grating coupler 1 according to the preferred embodiment may be used to couple light into a waveguide or a window with an efficiency substantially higher than 50% into either the positive first diffraction order or the negative diffraction order even at perpendicular incidence (α=0°), which is illustrated in FIG. 2a, in which the beam with highest intensity is illustrated as the thickest arrow. If light is coupled by the grating coupler 1 with high efficiency into the first positive diffraction order, the coupled light into the corresponding negative diffraction order will be low and vice versa. For example, if light is coupled with an efficiency higher than 70% into the positive first diffraction order, the coupled light into the negative diffraction order will be substantially lower than 30%. The same applies for an arrangement in which light has to be coupled with great efficiency into one of the second diffraction orders, or any other of the positive or negative diffraction orders.

In order to achieve coupling efficiencies higher than 50% in a specific positive or negative diffraction order, preferably the first diffraction order, the skilled person will be able, by using the further explained light coupling optimization method, to identify the required geometrical parameters and the needed materials of the asymmetric dielectric coating 5 to be arranged on the grating elements 4 of the grating coupler 1 in order to achieve that goal. The cross section and the geometrical parameters of a typical asymmetrical dielectric coating 5 according to the preferred embodiment of the invention are illustrated in FIG. 1c. The main geometrical and physical parameters of the diffraction grating elements 4 and the asymmetric dielectric coating 5 arranged on the diffraction grating elements 4 that have to be considered to realize a high efficiency optical coupling grating comprising said diffraction grating elements 4 and said asymmetrical dielectric coating 5 are:

the period P of the diffraction grating elements 4;
the ridge width s;
the grating depth t;
the sidewall coating thickness d$_s$;
the thickness of the dielectric coating d$_t$, this dielectric coating being arranged to the side of the incident light beam 10;
the thickness d$_b$ of the valley dielectric coating 5; the valley dielectric coating is defined as the portion of the asymmetric coating 5 arranged on a portion of the spacing 40 separating the diffraction grating elements 4;
the sidewall dielectric coating height h$_s$;
the dielectric coating width w$_t$, of the portion of the asymmetric dielectric coating 5 arranged to the incident light 10 side;
the absolute permittivity difference E1=|(∈$_r$−∈$_c$)| between the permittivity values of the dielectric coating 5 and the optical substrate 2;
the absolute permittivity difference E2=|(∈$_r$−∈$_c$)| between the permittivity values of the material adjacent and to the incident light side of the grating elements 4, and the dielectric coating 5;
the chosen material of the asymmetric dielectric coating 5.

The diffraction grating elements of the present invention are substantially binary grating elements of which the feature size 40, which is defined as the spacing (p−s) between the diffraction grating elements 4, may have a different dimension than the period P of the diffraction grating elements 4. Also, the feature size and the period of the diffraction grating elements 4 may vary across the surface of the grating coupler. This variation may be useful in the case of a fan-out grating coupler. The following table summarizes the ranges of allowed parameters of the elements of an exemplary grating coupler 1, arranged on a glass substrate 2, resulting of the optimization of an optical coupler 1, according to the preferred embodiment, and for a wavelength range between 390 nm-700 nm, said optimization being made by the optimization method according to an independent claim of the invention and which optimization method is further described in more detail.

TABLE 1

| Parameter | Possible range | Preferred range |
| --- | --- | --- |
| P | 190 nm to 1000 nm | 190 nm to 1000 nm |
| s | 0.1 to 0.9 × P | 0.25 to 0.7 × P |
| t | 10 nm to 5 × P | 50 nm to 2 × P |
| d$_s$ | 1 nm to (P − s) | 5 nm to (P − 0.8 s) |
| d$_t$ | 0 nm to P | 5 nm to 0.5P |
| d$_b$ | 0 nm to t | 0 nm to 0.7 × t |
| h$_s$ | 10 nm to (t + d$_t$ − d$_b$) | 50 nm to (t + d$_t$ − d$_b$) |
| w$_t$ | d$_s$ to (s + d$_s$) | (1.2 × d$_s$) + s + d$_s$ |
| E1 | 0 to 200 | 0 to 68 |
| E2 | 0 to 200 | 0 to 68 |

The obtained ranges of parameters may be easily scaled for other wavelengths, for example a wavelength typically used for telecom applications, i.e. 1.55 μm. The scaling is essentially based on using the well-known grating equation (in e.g. Diffraction grating handbook by Christopher Palmer, 6th edition, Newport Corporation, 2005). In the specific case of the exemplary grating coupler of which parameters are summarized in table 1, only first order diffraction angles higher than the angle of total reflection of glass has been considered, but the grating coupler according to the invention may diffract any incoming light beam 10 on the grating coupler 1 into a coupled light beam 20 in a substrate 2 according to any positive or negative diffraction order and according to any predetermined diffraction angle.

In order to achieve a greater design flexibility and so also a higher diffraction and coupling efficiency, a variant of the asymmetric dielectric coating 5 may comprise, as illustrated in FIGS. 1 d-e, an arrangement of at least two 51, 52 asymmetric coating layers, each designed and arranged according to the preceding given definition of an asymmetric dielectric coating 5. Said at least two 51, 52 asymmetric coating layers may comprise portions in metal or a semiconductor or the combination of a metal and a semiconductor. The asymmetric dielectric coating 5 may comprise at least a portion wherein the dielectric material is replaced by a metal, a semiconductor or a combination of a metal and a semiconductor, as illustrated in FIG. 1e. At least a portion of the dielectric coating may also comprise a metallic and/or semiconductor layer arranged on the dielectric coating. In such a variant, wherein at least one portion having a material different than the asymmetric dielectric coating 5 is arranged on said asymmetric dielectric coating 5, the parameters of the Table 1 are applicable for each of said portions.

The asymmetric dielectric coating may be a multilayer asymmetric dielectric coating.

Figure 3A:
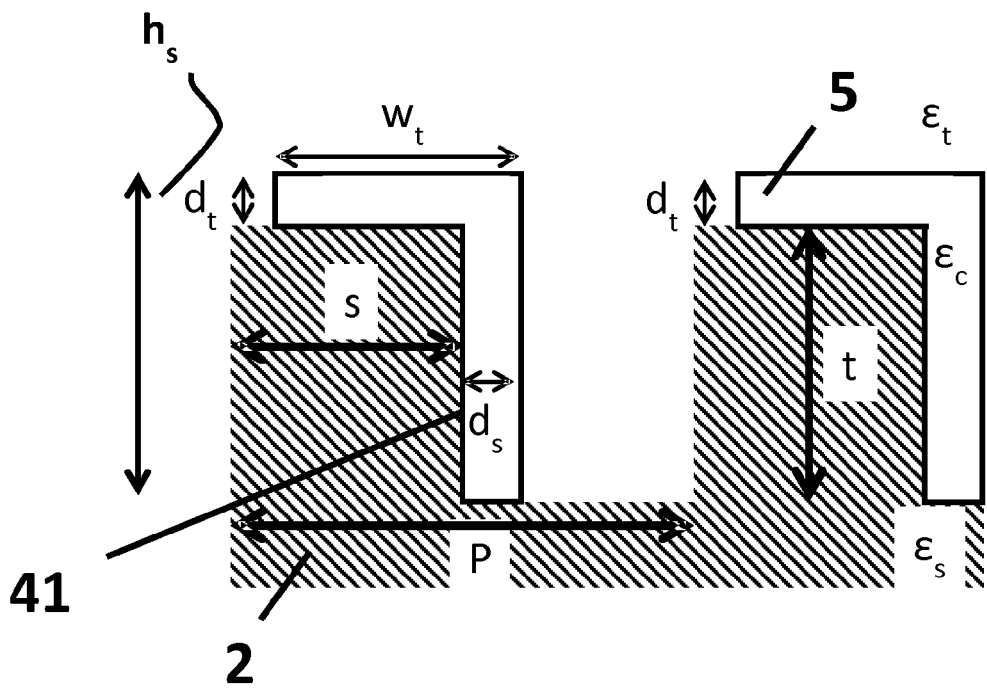
FIG. 3a illustrates a cross section of a diffraction grating element on which an asymmetric coating is arranged.

In a variant, illustrated in FIG. 3a, the main difference is that no dielectric layer 5 is arranged between two successive diffractive grating elements 4, and only a portion of the surface of the side walls 41 of the binary grating elements 4 may comprise a dielectric layer 5.

Figure 3B:
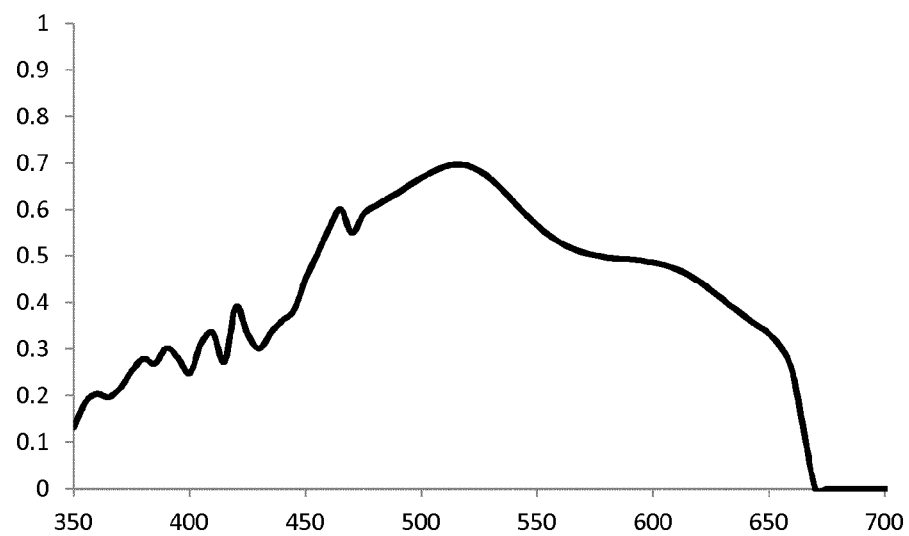

FIG. 3b shows the obtained theoretical first order diffraction efficiency of a grating coupler 1 arranged on a glass substrate 2 and comprising diffraction grating elements 4 having a structure according to FIG. 3a, comprising a ZnS asymmetrical dielectric coating, and having the following set of parameters of the grating diffraction elements 4 of the grating coupler 1:

p=440 nm; s=220 nm; t=320 nm; $d_s$=140 nm;
$d_t$=140 nm; $d_b$=0 nm; $h_s$=460 nm; $w_t$=360 nm;
∈c=6.7; ∈s=2.25; ∈t=1 (air);
refractive index (n) of ZnS=2.6; n (glass)=1.5

Figure 3C:
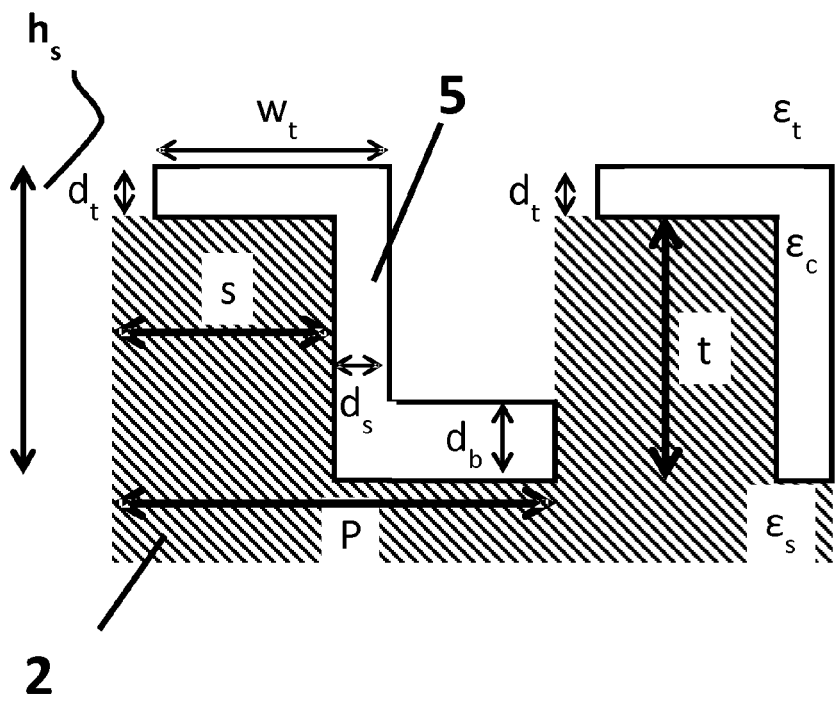
FIG. 3c illustrates a cross section of a diffraction grating element on which an asymmetric coating having a step profile is arranged.
Figure 3D:
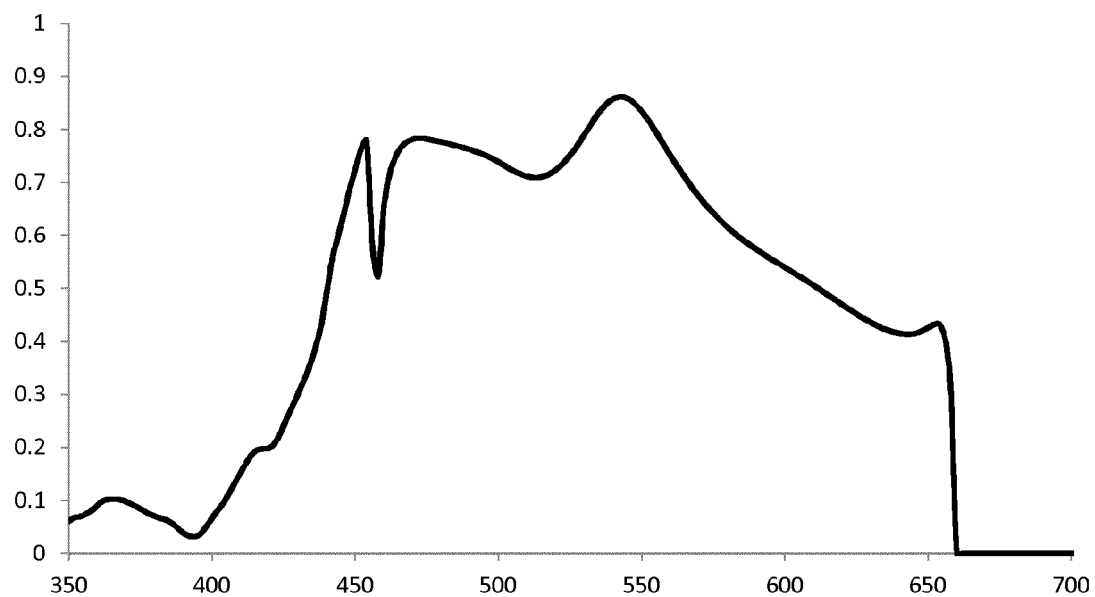
FIG. 3d illustrates the transmission efficiencies of the first diffracted order in function of the wavelength for the diffraction grating element of FIG. 3c.

In another variant the asymmetric dielectric coating 5 arranged on the binary grating elements 4 has a step-like arrangement, of which geometry and parameters are illustrated in FIG. 3c. FIG. 3d shows the obtained first order diffraction efficiency of a grating coupler 1 comprising grating element structures according to FIG. 3c having a ZnS asymmetric dielectric coating 5, and arranged on a glass substrate 2, and having the following set of parameters of the grating diffraction elements 4 of the grating coupler 1:

p=440 nm; s=220 nm; t=320 nm; ds=140 nm;
dt=140 nm; db=0 nm; hs=460 nm; wt=360 nm;
∈c=6.7; ∈s=2.25; ∈t=1 (air);
refractive index (n) of ZnS=2.6; n (glass)=1.5

Figure 3E:
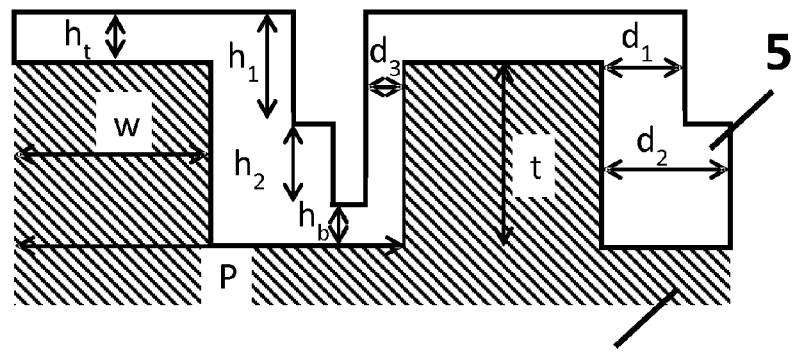
FIG. 3e illustrates a cross section of a diffraction grating element on which an asymmetric coating having a multi-step profile is arranged.
Figure 3F:
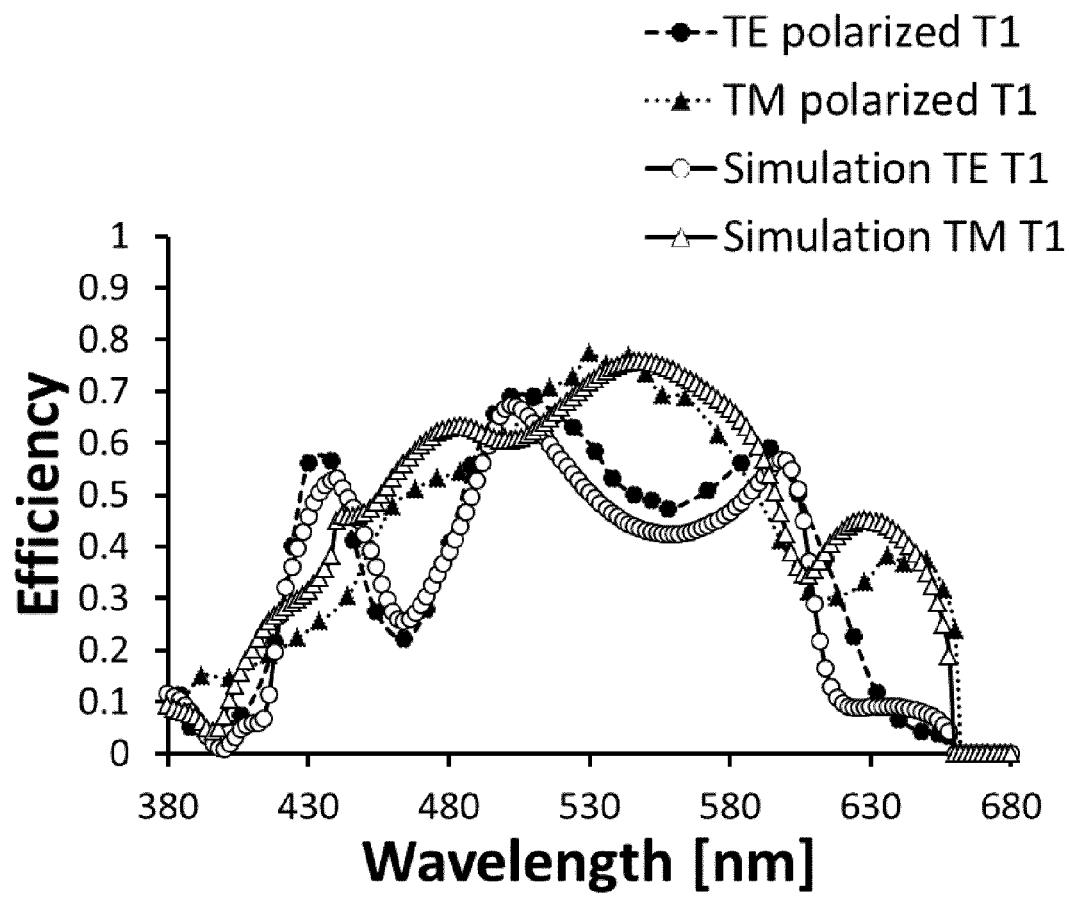
FIG. 3f illustrates the transmission efficiencies of the first diffracted order in function of the wavelength for the diffraction grating element of FIG. 3e.

In another variant the asymmetric dielectric coating 5 arranged on the binary grating elements 4 has a multiple step-like arrangement, of which geometry and parameters are illustrated in FIG. 3e. FIG. 3f shows the (theoretically and experimentally) obtained first order diffraction efficiencies of a grating coupler 1 comprising grating element 4 structures according to FIG. 3e having a ZnS asymmetrical dielectric coating 5, and arranged on a glass substrate 2, and having the following set of parameters of the grating diffraction elements 4 of the grating coupler 1:

p=440 nm; h1=280 nm; h2=100 nm; t=285 nm; w=145 nm
d1=100 nm; d2=172 nm; d3=23 nm; hb=55 nm; ht=150 nm;
∈c=6.7; ∈s=2.25; ∈t=1 (air);
refractive index (n) of ZnS=2.6; n (glass)=1.5

Figure 3G:
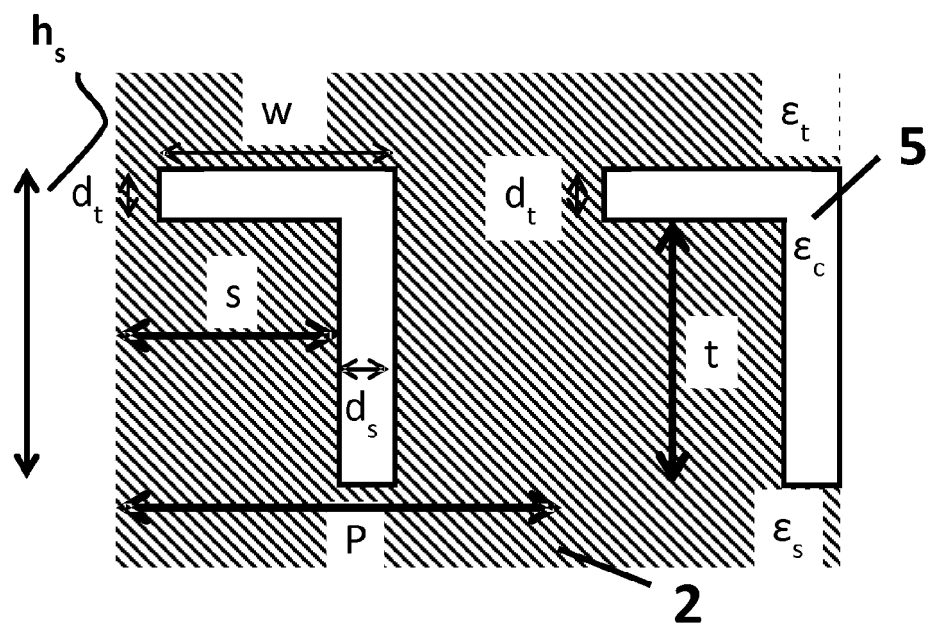
FIG. 3g illustrates a cross section of an embedded coupler comprising a diffraction grating element on which an asymmetric coating is arranged.
Figure 3H:
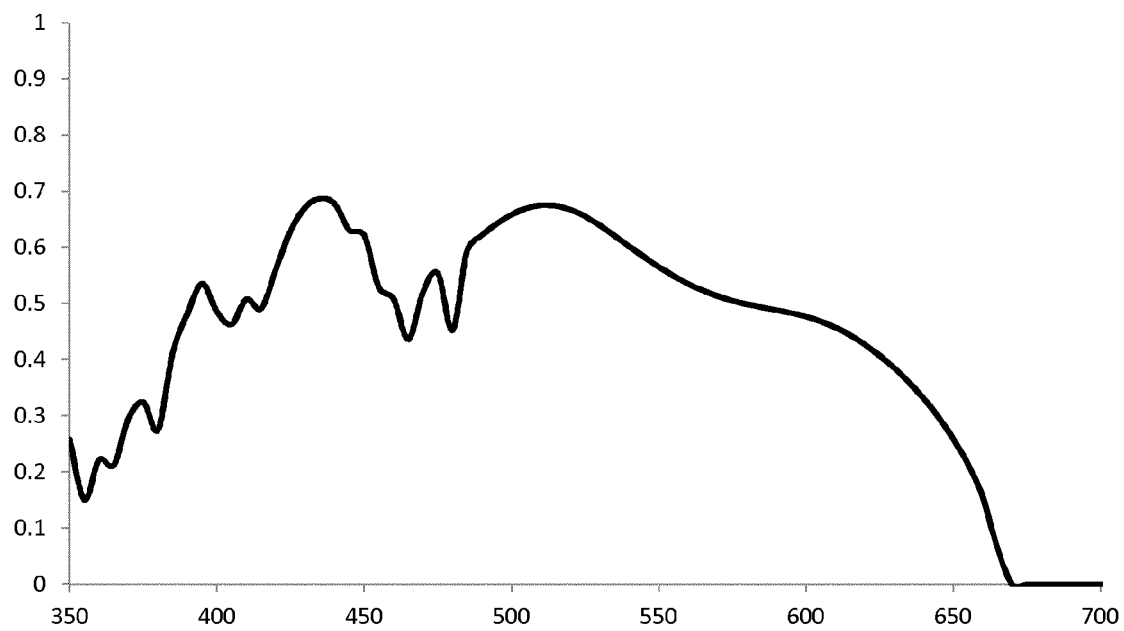
FIG. 3h illustrates the transmission efficiency in function of the wavelength for the diffraction grating element of FIG. 3g.
Figure 7A:
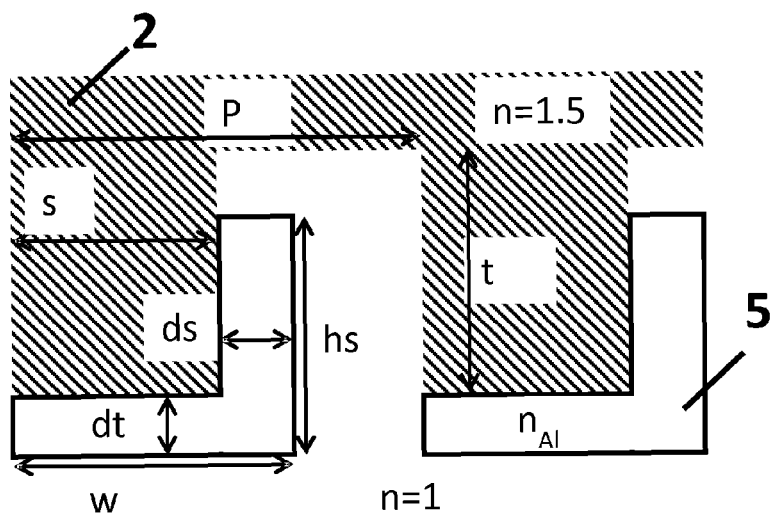
FIG. 7a illustrates a cross section of a grating coupler comprising diffraction grating elements on which an asymmetric metallic coating is arranged.
Figure 7B:
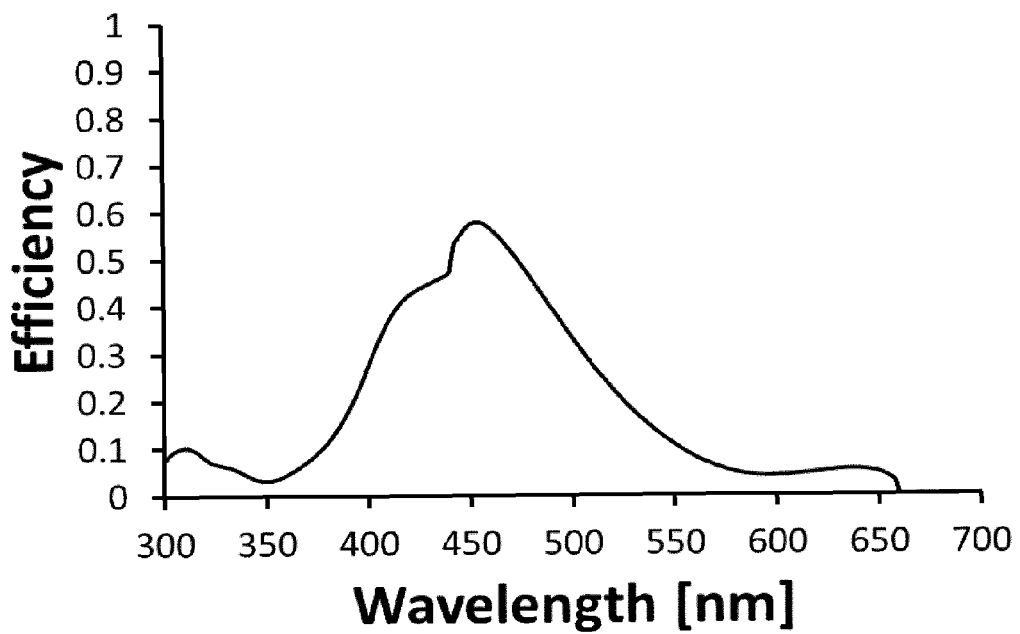
FIG. 7b illustrates the reflection diffraction efficiency in function of the wavelength for the diffraction grating element of FIG. 7a having an asymmetric metallic coating.

In another variant, shown in FIG. 3g the grating coupler 1, comprising binary grating elements 4 and the asymmetric dielectric coating 5 arranged on the binary grating elements 4, is embedded in the optical substrate 2. Alternatively, the grating coupler 1 may be arranged at the interface of a first optical medium and a second optical medium, both optical mediums having the same index of refraction. Said first and said second optical mediums may be separated by a refractive index matching material, preferably a thin layer of an index adapting liquid, the thin layer having a typical thickness smaller than 1 micron. Said index adapting material may be a glue layer. More precisely the grating coupler may be arranged at a distance to the surface of the optical substrate 2 substantially equal to the height hs of the binary diffraction grating elements 4 of the grating coupler 1. There is no limitation of the distance of the imbedded grating coupler 1 to the surface of the optical surface, although in practical systems this distance may be typical in the range of a mm or a cm. The grating coupler 1 may be parallel to the surface of the optical substrate 2 or may have any inclination angle relative to the surface of the optical substrate 2. The geometry and the parameters of an exemplary embedded grating coupler 1 are shown in FIG. 3g. FIG. 3h shows the obtained diffraction efficiency of an embedded grating coupler 1 comprising diffraction grating element 4 structures according to FIG. 3g, comprising a ZnS asymmetrical dielectric coating 5, and arranged inside a glass substrate 2, and having the following set of parameters of the grating diffraction elements 4 of the embedded grating coupler 1:

p=440 nm; hs=470 nm; w=145 nm;
ds=150 nm; dt=150 nm; s=220 nm; t=320 nm;
∈c=6.7; ∈s=2.25; ∈t=2.25 (glass);

In an embodiment the asymmetric coating 5 is a metal coating. FIG. 7a shows the cross section of binary grating elements 4 on which an asymmetric metallic coating is arranged, having a step-like arrangement. FIG. 7b shows the obtained first reflection order diffraction efficiency of an optical coupler comprising grating element structures, according to FIG. 7a, and arranged on a glass substrate 2, and having the following set of parameters of the grating diffraction elements 4 of the grating coupler 1:

p=440 nm; s=176 nm; t=300 nm; ds=90 nm;
dt=90 nm; hs=340 nm; w=266 nm;
Metal: Al; n (glass)=1.5.

Figure 7C:
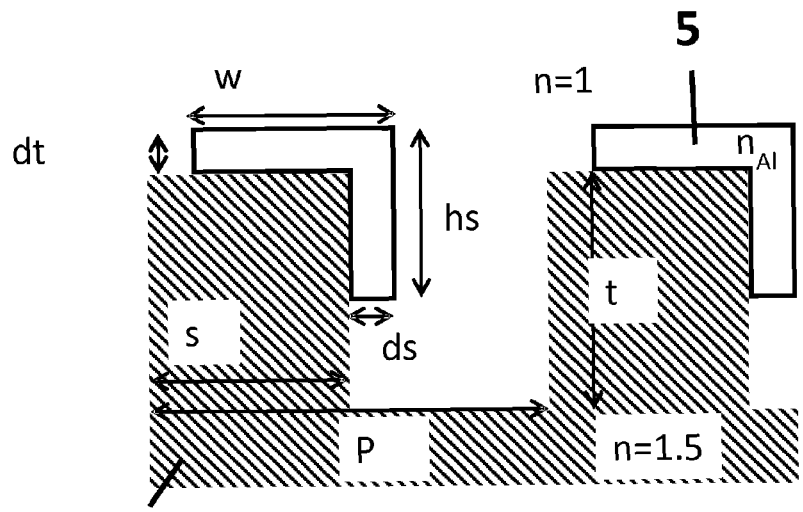
FIG. 7c illustrates a cross section of another grating coupler comprising diffraction grating elements on which an asymmetric metallic layer is arranged.
Figure 7D:
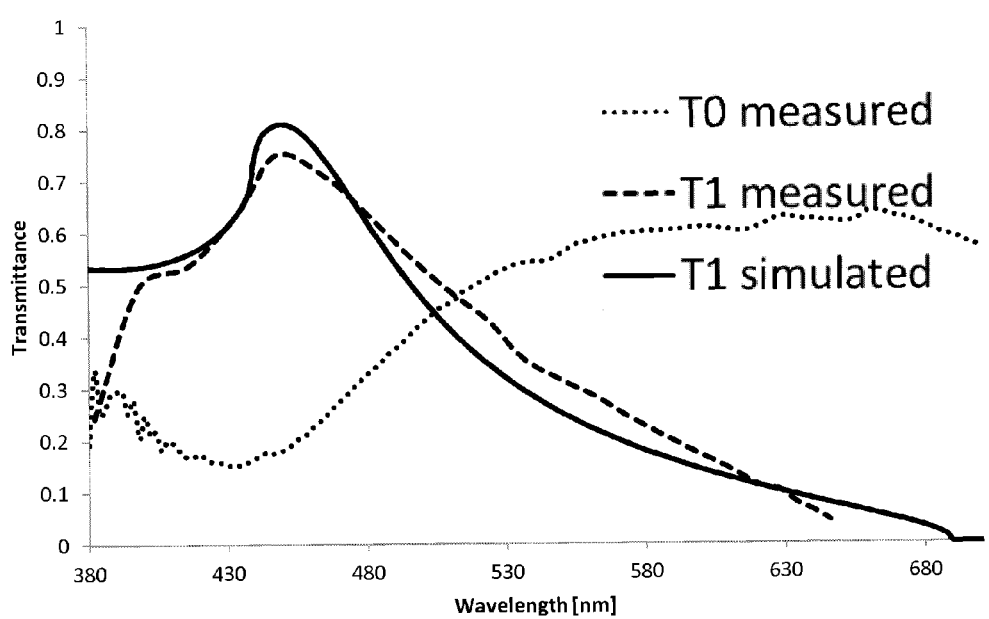
FIG. 7d illustrates the polarized transmission efficiency in function of the wavelength for the diffraction grating element of FIG. 7c having an asymmetric metallic coating.

A variant of binary grating elements 4 on which an asymmetric metallic coating 5 is arranged, having a step-like arrangement, is illustrated in FIG. 7c. FIG. 7d shows the obtained first order diffraction efficiency of an optical coupler 1 comprising grating element structures 4 according to FIG. 7c, and arranged on a glass substrate 2, and having the following set of parameters of the grating diffraction elements 4 of the grating coupler 1:

p=440 nm; s=220 nm; t=250 nm; ds=13 nm;
dt=4 nm; hs=104 nm; w=224 nm;
Metal: Al; n (glass)=1.5.

In an embodiment the asymmetric coating 5 may be a semiconductor coating. In a variant the asymmetric coating 5 may comprise at least two portions, each portion being a metal or a semiconductor. In a variant the asymmetric coating 5 may comprise an asymmetric dielectric coating arranged on an asymmetric metallic coating or an asymmetric semiconductor coating.

Figure 4:
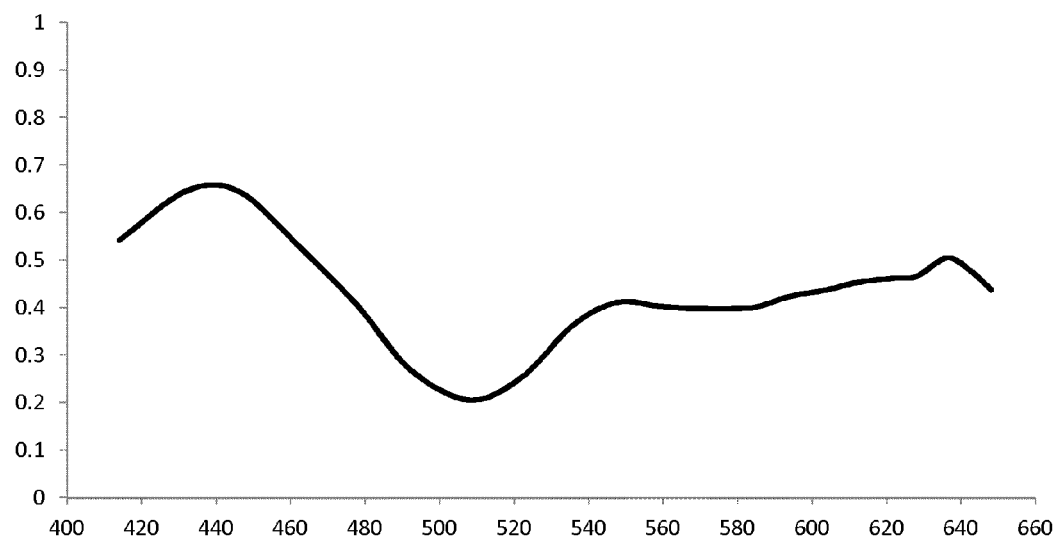
FIGS. 4a,b show SEM images of diffraction grating elements on which an asymmetrical dielectric layer has been deposited.
FIG. 4c shows a SEM image of diffraction grating elements on which an asymmetrical metallic layer has been deposited.
FIG. 4d shows the transmission coupling efficiency in function of wavelength for the structure of FIG. 4b.
FIG. 4e shows an experimental test set-up that allows to determine the coupling efficiency.
Figure 4E:
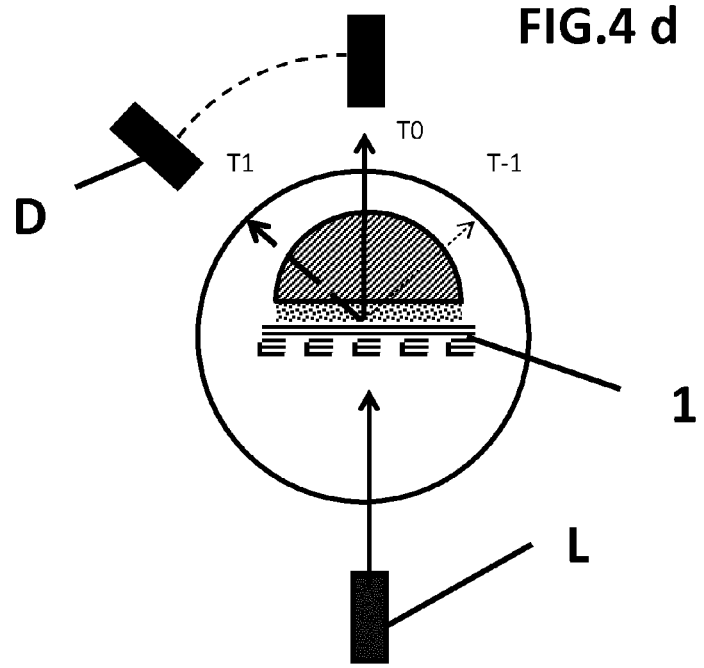

FIG. 4 a, b, c show SEM images of exemplary grating couplers 1 comprising binary grating elements 4 on which an asymmetric coating 5 is deposited. The asymmetric dielectric coating 5 structure shown in FIG. 4b corresponds to a realization of the grating coupler of FIG. 1a and FIG. 1b. FIG. 4d shows the corresponding measured coupling efficiency obtained for that structure. FIG. 4e shows a typical test set-up, well known to a person skilled in the art of optical test systems. In order to test the diffraction efficiency of the grating coupler 1, the grating coupler 1 is arranged on a transparent holder. The sample comprising the grating coupler 1 is illuminated by a light source L of which the wavelength can be changed. The diffracted light by the grating coupler 1 is detected by a rotatable detector as illustrated in FIG. 4e.

It is important to notice that the range of the parameters (apart from the grating period) summarized in table 1, to realize an efficient coupler according to said exemplary grating coupler, which may be an incoupler or an outcoupler, is independent of the type of optical substrate in which the light is coupled. More precisely, the optical substrate 1 is preferably a waveguide but may also be a window, or any transparent support on which the grating coupler is arranged. Said optical substrate 2 may comprise a plurality of optical substrates and at least one of said optical substrates may be a liquid substrate or a substrate comprising at least a liquid portion. The incoupling efficiency of the grating coupler 1 is merely determined by the above described geometrical parameters summarized in Table 1 and the physical characteristics of the materials of the optical substrate 2 and the asymmetric dielectric coating 5. It should be outlined that said coupling efficiency is not influenced by any interaction or interference of partially reflected light of at least a portion of the coupled light beam from any surface that may be arranged to the side of the grating coupler opposite to the incident light side, such as in the case of resonating waveguides, or zero-order filters, or in the case of waveguides wherein coupling efficiencies may be enhanced by leaky waves interacting or interfering with the coupled light by a grating arranged on such waveguides.

The grating coupler 1 according to the preferred embodiment may be arranged and optimised as an input coupler (also called "incoupler") to couple efficiently light from a first optical medium to a second optical medium having a higher optical density than the first optical medium, for example to couple an incident light beam 10 transmitted in air, into a substrate made of glass or plastic. The grating coupler 1 may also be designed and optimized as an output coupler (also called "outcoupler"), to outcouple efficiently light from a first optical dense medium into a second optical medium that is optically less dense than the first optical medium, for example in the case of a light beam 30 leaving a glass substrate to an outside optical medium having a lower index of refraction, preferably air.

FIG. 5 illustrates several, non-limiting, embodiments of grating couplers, arranged as input couplers or output couplers.

FIG. 5a shows a grating coupler 1 arranged as an input coupler, arranged to the incident light side of an optical substrate 2. Such an arrangement may be used to couple light inside a window or a waveguide.

FIG. 5b shows another grating coupler 1 arranged as an incoupler. Such an arrangement may be used to couple light inside a window or a waveguide. The incident light on the grating coupler 1 may be a propagating beam inside a window or waveguide incident on the grating coupler after at least one internal reflection in said window or waveguide, but may also be a direct incident beam transmitted by the optical substrate without any internal reflection inside said optical substrate. An exemplary application is when it is desired that the grating coupler 1 is arranged to the side of a window or waveguide opposite to the incident light beam on that window or waveguide. A possible application is in optical systems requiring to couple light to the side of a light source and wherein said light source is arranged directly to the optical substrate 2.

FIG. 5c shows a grating coupler 1 arranged as an outcoupler. Such an arrangement may be used to couple light, propagating inside a window or waveguide, outside that window or waveguide.

FIG. 5d shows a grating coupler 1 arranged to change the direction of a light beam propagating inside a window or a waveguide. The redirected light beam by the grating coupler may further propagate inside a window or waveguide or may also be transmitted outside the optical substrate without any internal reflection inside said optical substrate. An exemplary application is when it is desired that the grating coupler is arranged to the side of a window or waveguide opposite to the outcoupled light beam of that window or waveguide. A possible application is in systems requiring to couple light propagating inside a window or waveguide, onto a photodetector arranged opposite to said photodetector.

FIG. 5e and FIG. 5f illustrate embedded grating couplers. Embedded grating couplers may be used in applications wherein the grating couplers must be protected from contamination or damage. By embedding the grating couplers inside the optical substrate, damage or partial loss of its coupling efficiency is avoided. FIG. 5e shows a grating coupler, arranged as a transmission grating coupler, embedded in an optical substrate and arranged to change the direction of the light beam propagating inside the optical substrate. A typical application is when it is desired to redirect, inside an optical medium, a predetermined part of the spectrum of the light beam into another direction into the optical medium.

FIG. 5f shows a grating coupler 1, arranged as a reflection grating coupler, embedded in an optical substrate 2 and arranged to change the direction of the light beam propagating inside the optical substrate 2.

The described grating couplers 1 may be arranged in different combinations as illustrated in FIGS. 5g-j. For example, two different types of grating couplers may be arranged as respectively an incoupler and an outcoupler on a waveguide or an optical window, each at a same side or each at another side of the waveguide or the optical window.

Figure 5G:
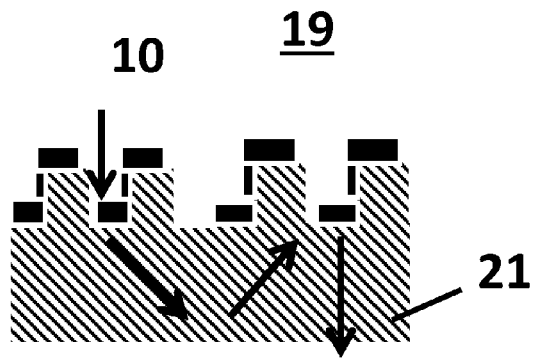
FIG. 5 a-l illustrate different embodiments of the grating coupler.
FIG. 5a illustrates a grating coupler arranged to change the direction of an incident beam on the grating coupler.
FIG. 5b; illustrates a grating coupler arranged to couple light into an optical substrate.
FIG. 5c illustrates a grating coupler arranged to couple light out of an optical substrate.
FIG. 5d illustrates another grating coupler arranged to change the direction of an incident beam on the grating coupler.
FIG. 5e illustrates a transmission grating coupler embedded in an optical substrate or arranged between a first and second optical substrate having the same index of refraction.
FIG. 5f illustrates a reflection grating coupler embedded in an optical substrate or arranged between a first and second optical substrate having the same index of refraction.
FIG. 5m illustrates a grating coupler comprising a 2D arrangement of diffraction grating elements.
Figure 5H:
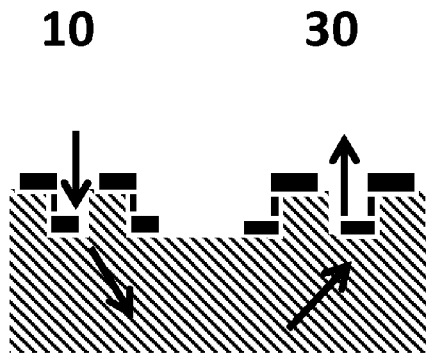
Figure 5I:
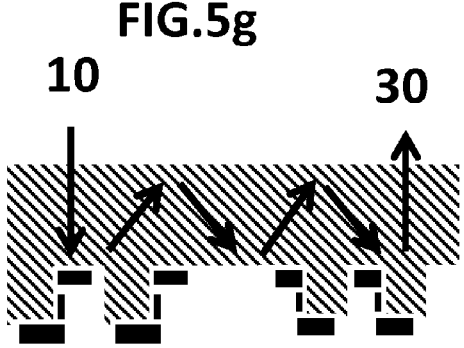
Figure 5J:
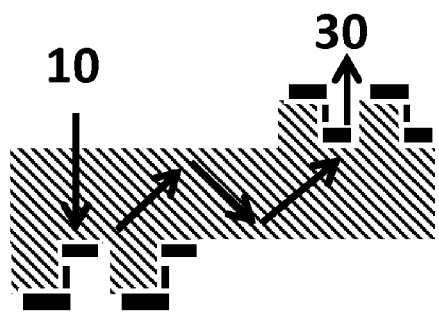
Figure 5K:
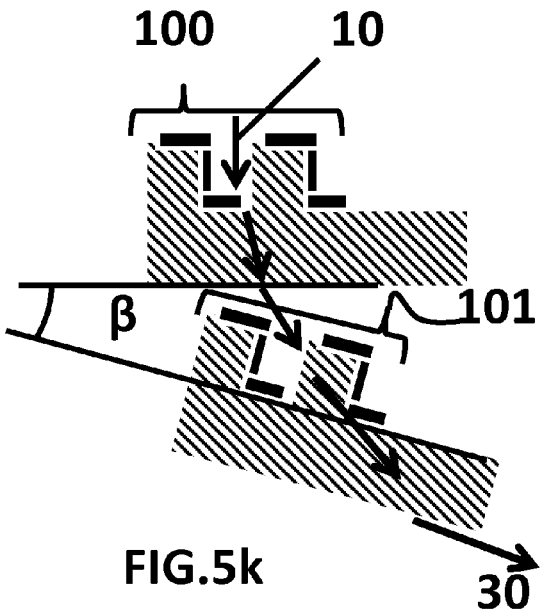
Figure 5L:
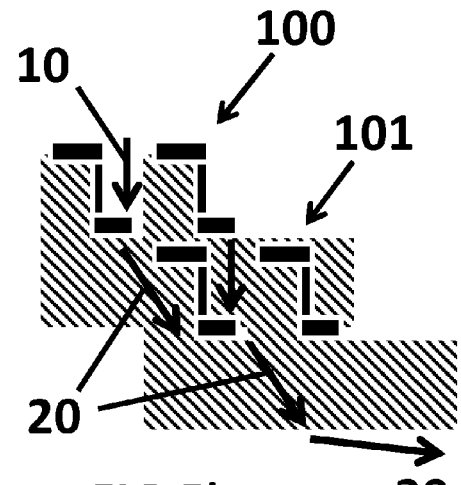
Figure 5M:
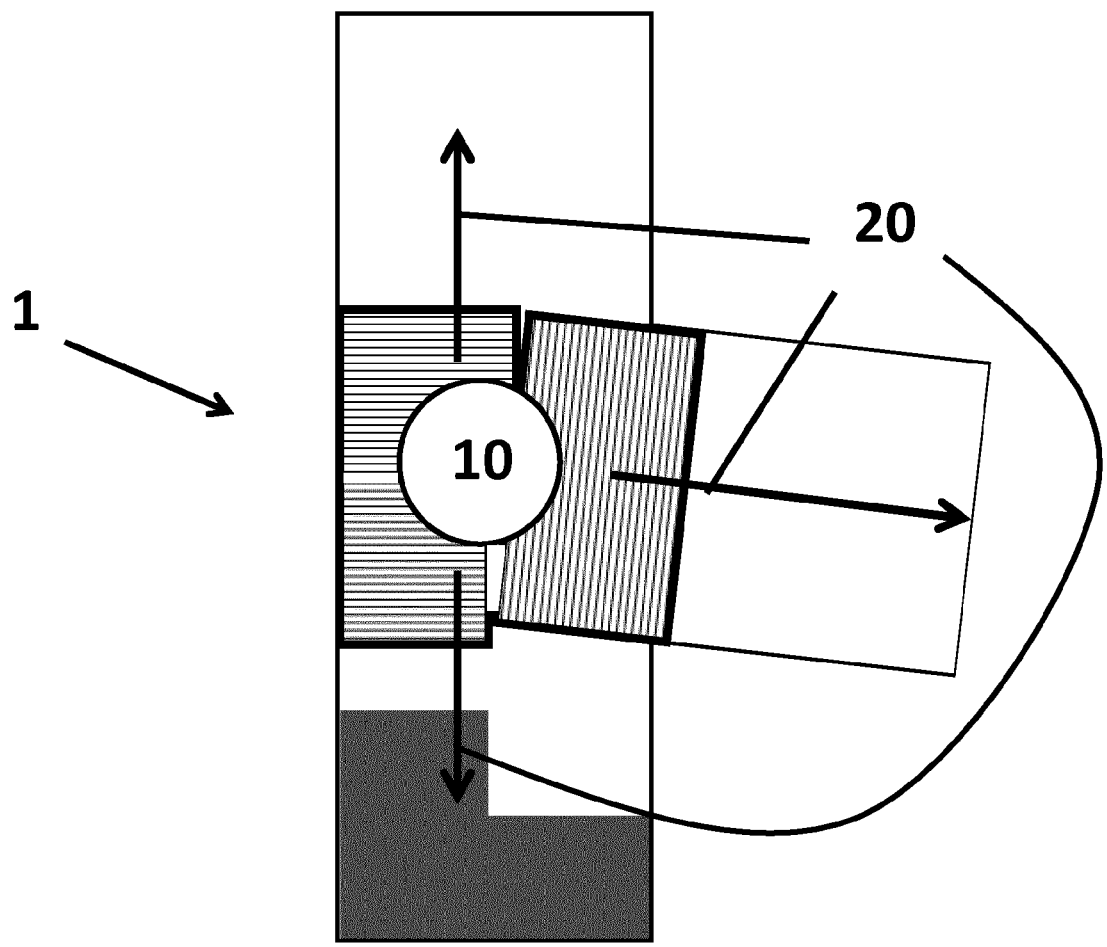

In an embodiment the grating coupler 1 may comprise at least two equal or two different grating couplers 100, 101, arranged in parallel to each other or arranged with a relative angle β, as illustrated in FIG. 5k and FIG. 5l. It will be obvious for the skilled person to arrange grating couplers in close proximity, preferably separated by substantially the height hs of the grating couplers. A grating coupler comprising at least two equal or two different grating couplers, in close proximity, allows to realize grating couplers with a greater design flexibility such as optimization in function of wavelength, diffracted angles and higher coupling efficiencies.

Grating couplers 1 as illustrated in FIG. 5 may be applied for a wide range of applications, such as, but not limited to wearable displays, for example google glasses, see-through displays, optical signage applications in e.g. car dashboards, lightning applications, sun light concentrators, optical systems to redirect the light, optical sensing platforms, security elements comprising waveguides, applications for security devices integrated documents and also tamper seals.

Figure 3I:
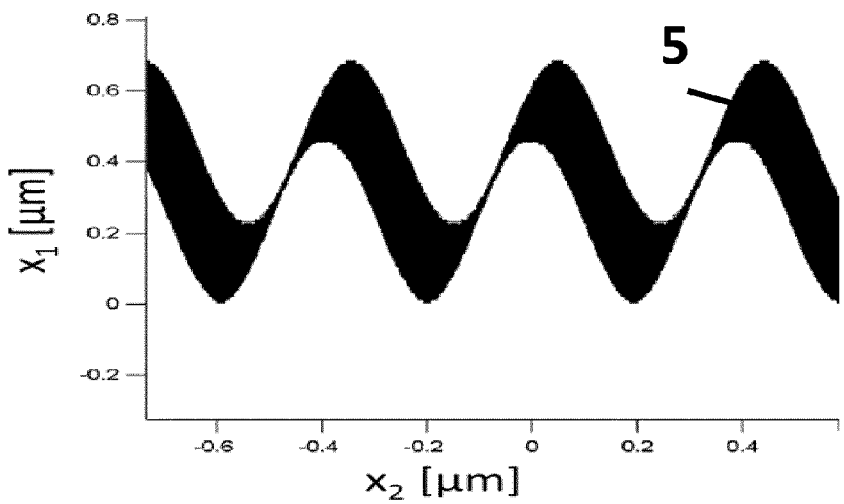
FIG. 3i illustrates a grating coupler comprising diffraction grating elements having a sinusoidal cross section and on which an asymmetric coating is arranged.
Figure 3J:
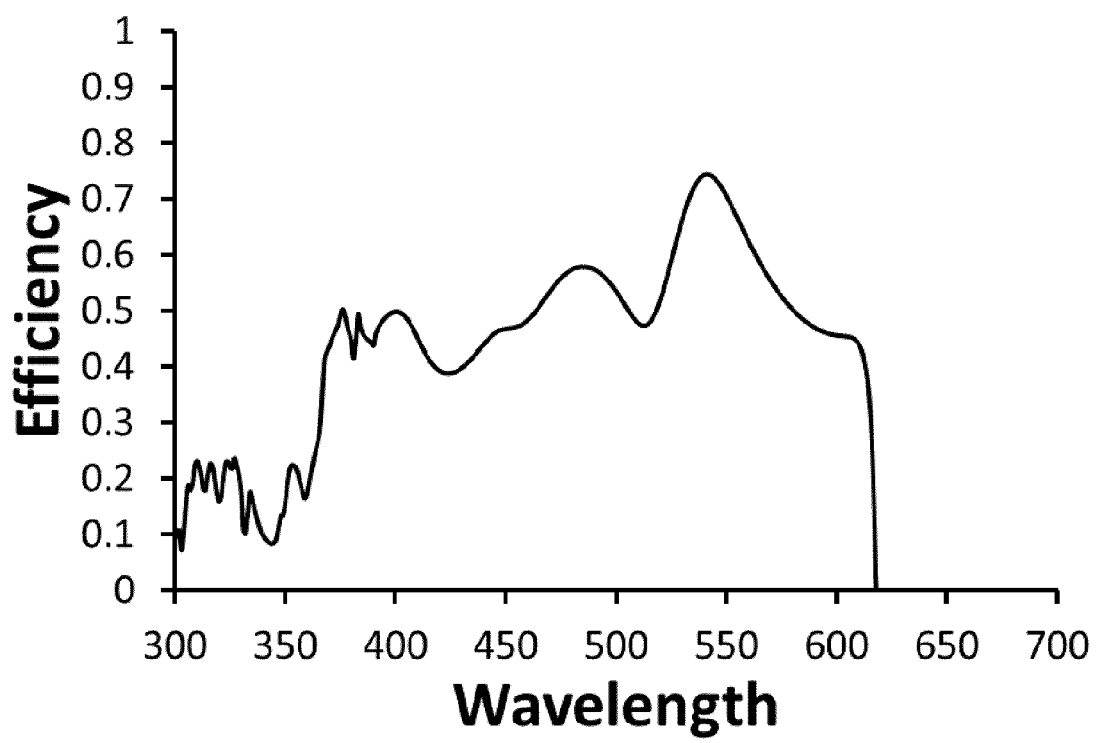
FIG. 3j illustrates the transmission efficiency of the first diffracted order in function of the wavelength for the grating coupler of FIG. 3i.
Figure 6A:
FIG. 6a illustrates a cross section of another grating coupler, comprising diffraction grating elements having a substantial semi-circular cross section, on which an asymmetric coating is arranged.
Figure 6B:
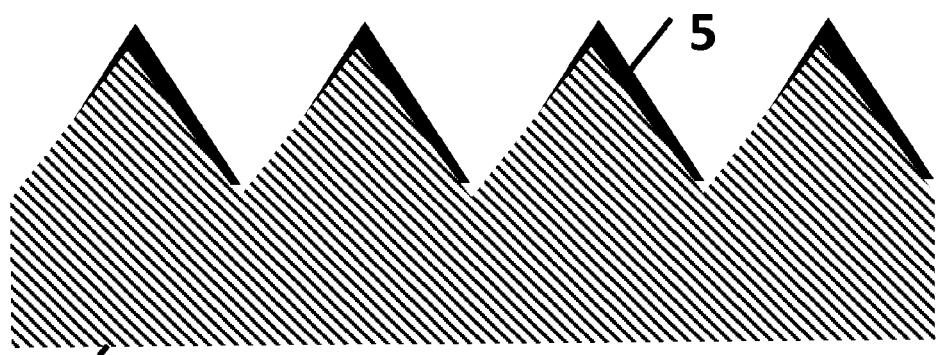
FIG. 6b illustrates a cross section of another grating coupler, comprising diffraction grating elements having a substantial triangular cross section, on which an asymmetric coating is arranged.
Figure 6C:
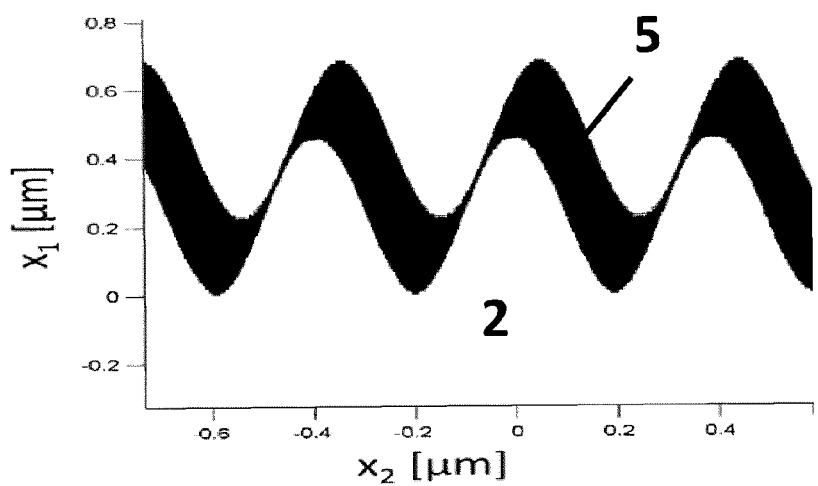
FIG. 6c illustrates a cross section of another grating coupler comprising diffraction grating elements having a sinusoidal shaped cross section on which an asymmetric coating is arranged.

In several different embodiments the grating coupler 1 may comprise diffraction grating elements 4 that have substantially rectangular, triangular, sinusoidal, cycloidal, trapezoidal, staircase or semi-circular cross sections, said cross sections being defined in the direction of the propagating light beam. FIG. 6 *a, b, c* shows examples of a grating coupler 1 comprising diffraction grating elements 4 having respectively a substantial semi-circular cross section, a substantial triangular cross section and a substantial sinusoidal cross section. FIG. 3i shows a diffraction grating coupler having a sinusoidal cross section and the transmission coupling efficiency of the diffraction grating coupler of FIG. 3i.

Figure 8:
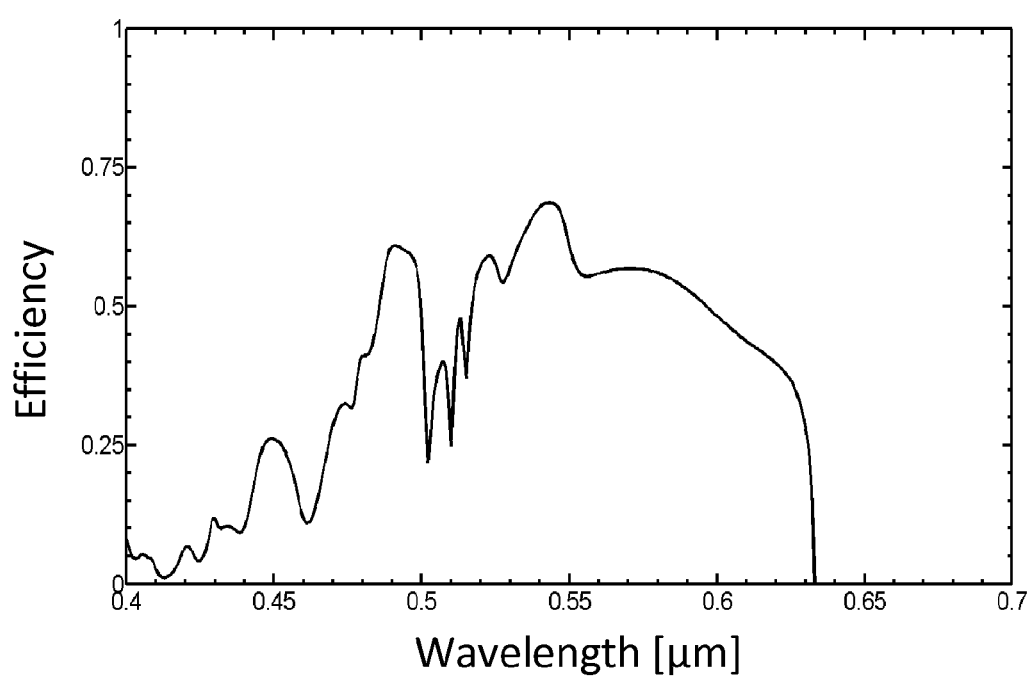
FIG. 8 illustrates the efficiency incoupling spectrum for light coupled in the positive second diffraction order.

The grating coupler according to the invention may be arranged and optimized to couple, by diffraction, a light beam with an efficiency higher than 50% into any of the positive or negative diffraction orders. An exemplary result of such an efficient light coupling at perpendicular incidence into the second positive order is shown in FIG. 8.

Grating couplers 1 according to the preceding embodiments can be applied in a wide range of optical devices. Grating couplers may be designed as input couplers or as output couplers of a light beam. The combination of input couplers 1 and/or output couplers 1 allow to have a wide set of arrangements to manage light in a huge variety of optical systems, comprising a wide range of possible optical substrates 1.

Figure 9:
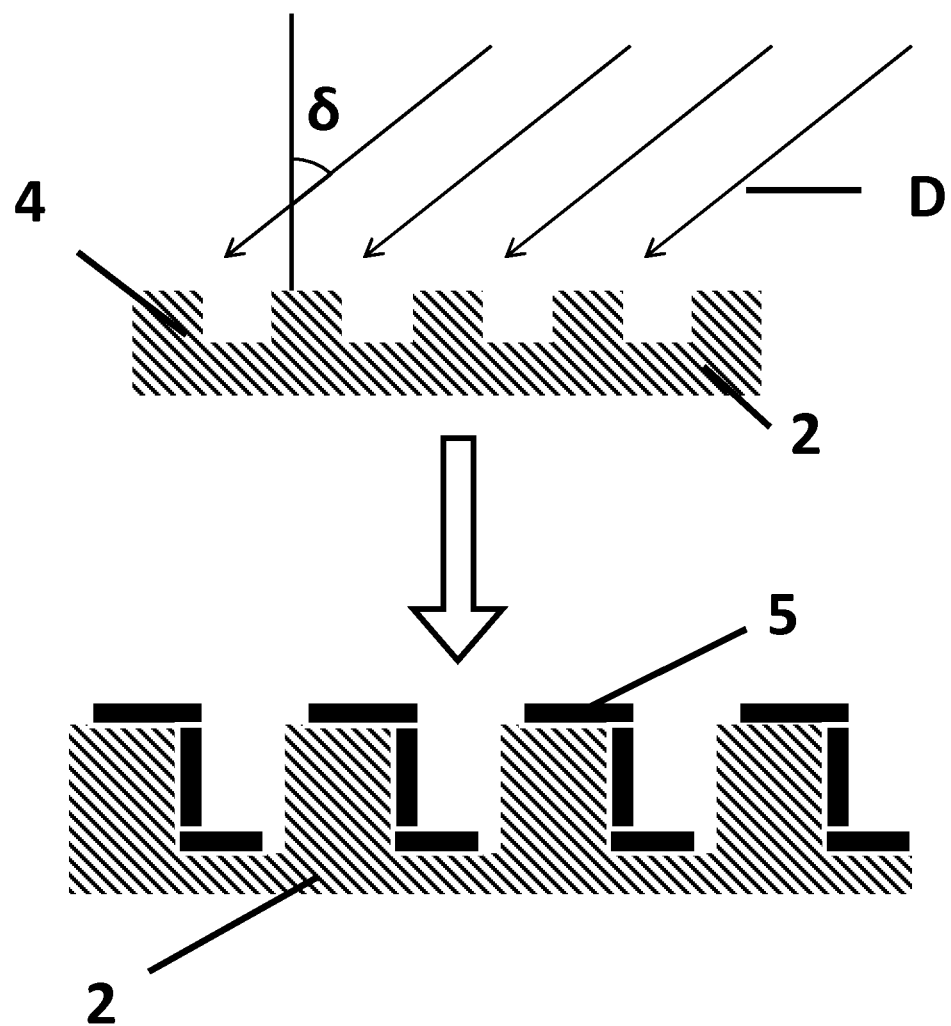
FIG. 9 shows the manufacturing steps to fabricate a coupler comprising diffraction grating elements on which an asymmetric coating is deposited.

The diffraction grating elements 4 of the grating coupler 1 are substantially elongated elements distributed periodically in the proceeding direction of a light beam transferred from the diffraction, but in an embodiment the grating coupler may comprise grating elements 4 that are distributed in a 2-dimensional array of said grating elements, arranged in the plane of said diffraction gratin and these grating elements may have refractive and diffractive properties, for example obtained by a 2Dimension distribution of substantially circular shaped grating elements The grating couplers 1 according to the different embodiments of the invention are realized by a new approach to fabricate asymmetric diffractive gratings, which does not rely on sophisticated grating masters. Readily available binary diffraction gratings are replicated in a standard UV casting process and subsequently angle evaporated with either dielectrics or metals to realize the asymmetrical coating and thus blaze the grating elements after the replication of the grating elements. This fabrication method is illustrated in FIG. 9, in which the deposition D of an asymmetric coating on the diffraction grating elements is realized under a predetermined angle δ. The deposition process of a coating under a certain angle on a substrate is well known to the person skilled in the art D. Flanders and A. White, "Application of Almost-Equal-to 100 a Linewidth Structures Fabricated by Shadowing Techniques," Journal of Vacuum Science & Technology 19, 892-896 (1981), and may be realized by evaporation techniques or sputtering techniques or the like. The simple yet powerful fabrication procedure was already used more than 30 years ago to generate structures as small as ≈10 nm. This same technique is used to apply, preferably, a ZnS coating as the said dielectric coating and achieve non-polarized first diffraction order transmittance (T1) efficiency, at perpendicular incidence, of substantially 70%.

The entire fabrication process of the diffraction grating elements 4 comprising an asymmetrical coating 5 on each of said diffraction grating elements 4 is suitable for mass production and therefore the present approach is a cheap alternative to existing industrial manufacturing methods of blazed gratings. Since the grating coupler to be replicated is a very simple structure, it can be replicated by any of the common mass production methods such as hot embossing or injection molding and the replica process is not limited to UV casting. Finally, the grating coupler 1 according to the invention remains functional when it is embedded in the optical substrate (i.e. a waveguide or an optical window), which is not possible when using uncoated standard relief gratings.

The invention relates also to a light coupling system 200, comprising:
an optical substrate 2 to transfer a light beam,
an input grating coupler 100 arranged on said optical substrate 2 to incouple an incident light into said optical substrate 2,
an output grating coupler 102 arranged on said optical substrate 2 to outcouple light from said optical substrate 2.

The optical substrate 2 of the light coupling system 200 may be a waveguide or a window.

The light coupling system 200 may be realized by arranging on the optical substrate 2 different embodiments of the grating couplers 1 as described above. The light coupling system 200 may comprise at least two grating couplers 1 arranged as input couplers, and may comprise at least two grating couplers arranged as output couplers. The lightcoupling system 200 may comprise several lightcoupling portions, and each portion may be arranged in a different plane.

Figure 10A:
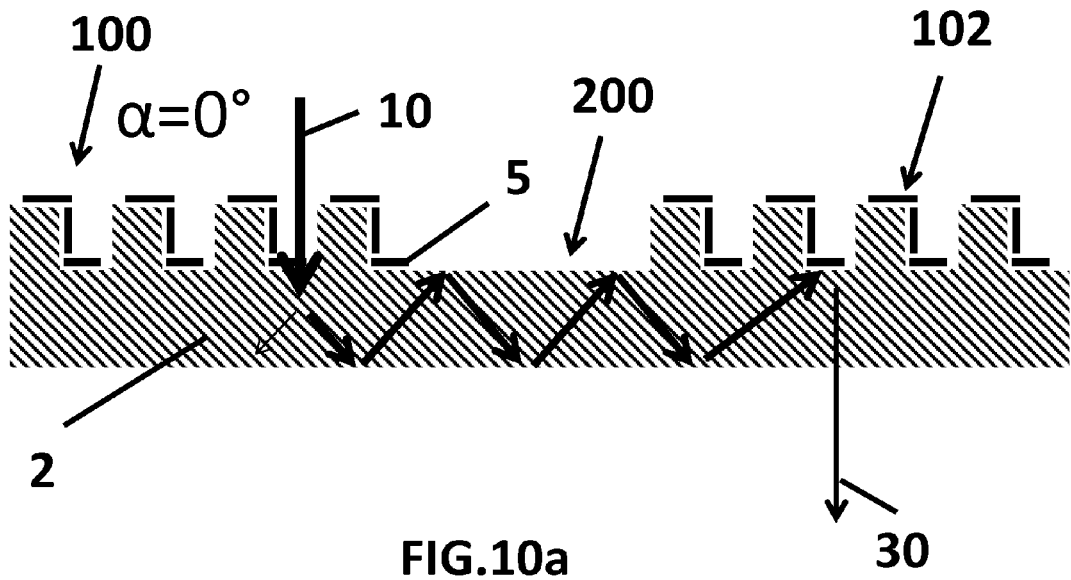
FIG. 10a shows a light coupling system comprising an incoupler and an outcoupler comprising diffraction grating elements comprising an asymmetric dielectric coating.
Figure 10B:
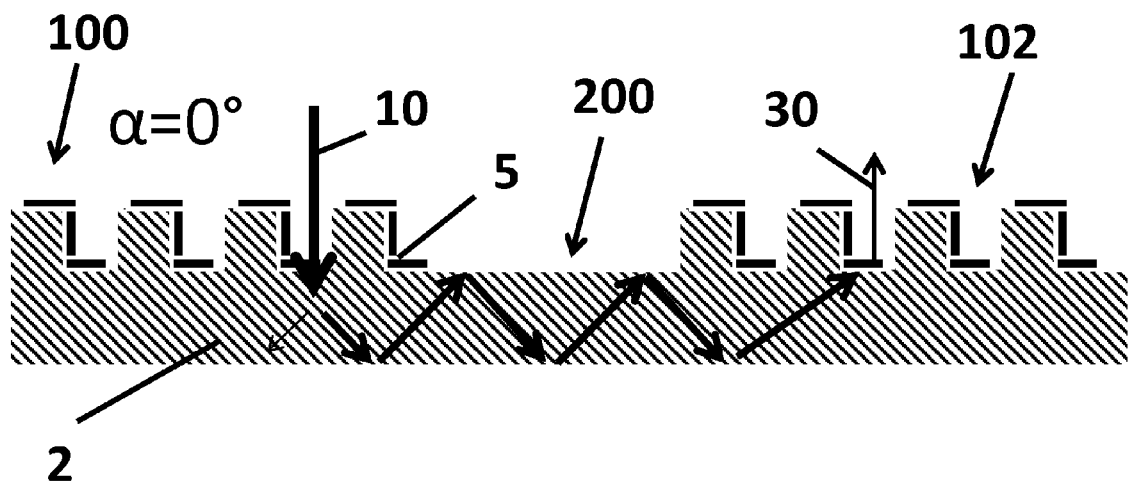
FIG. 10b shows another a lightcoupling system comprising an incoupler and an outcoupler comprising diffraction grating elements comprising an asymmetric dielectric coating.

FIGS. 10a and 10b show two exemplary embodiments of a light coupling system 200, wherein in incoupler 100 and an outcoupler 102 comprise binary grating elements 4 on which an asymmetric coating 5 is arranged and which are adapted to the light coupling system 200 to respectively couple the light in and out of an optical substrate 2, which may be a window or a waveguide, preferably a multimode waveguide.

Figure 10C:
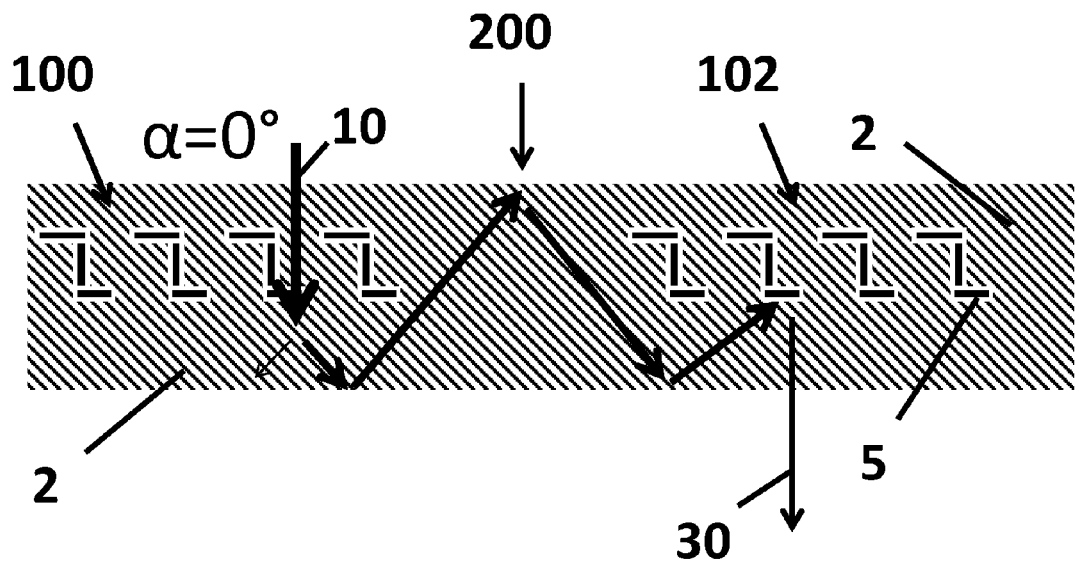
FIG. 10c shows a lightcoupling system comprising an incoupler and an outcoupler comprising diffraction grating elements comprising an asymmetric dielectric coating.
Figure 10D:
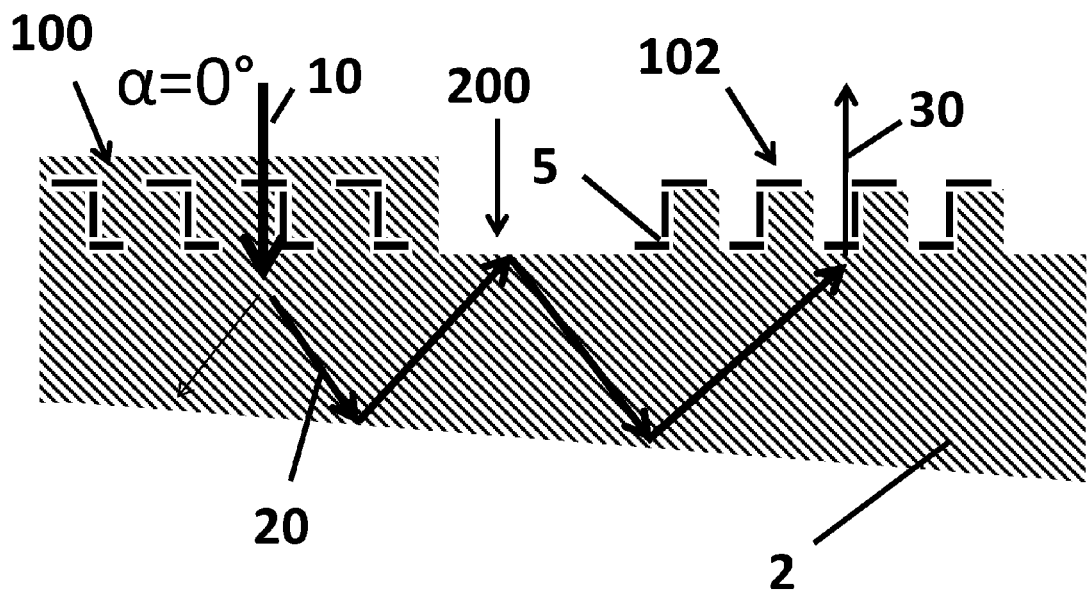
FIG. 10d shows a lightcoupling system comprising an incoupler and an outcoupler comprising diffraction grating elements comprising an asymmetric dielectric coating.

FIGS. 10c and 10d show two other exemplary embodiments of a light coupling system 200, wherein the incoupler 100 and/or the outcoupler 102 is embedded into the optical substrate 2 of the light coupling system 200 and which are arranged respectively to couple the light into and out of the optical substrate 2, said optical substrate 2 being a window or a waveguide, preferably a multimode waveguide.

Figure 11:
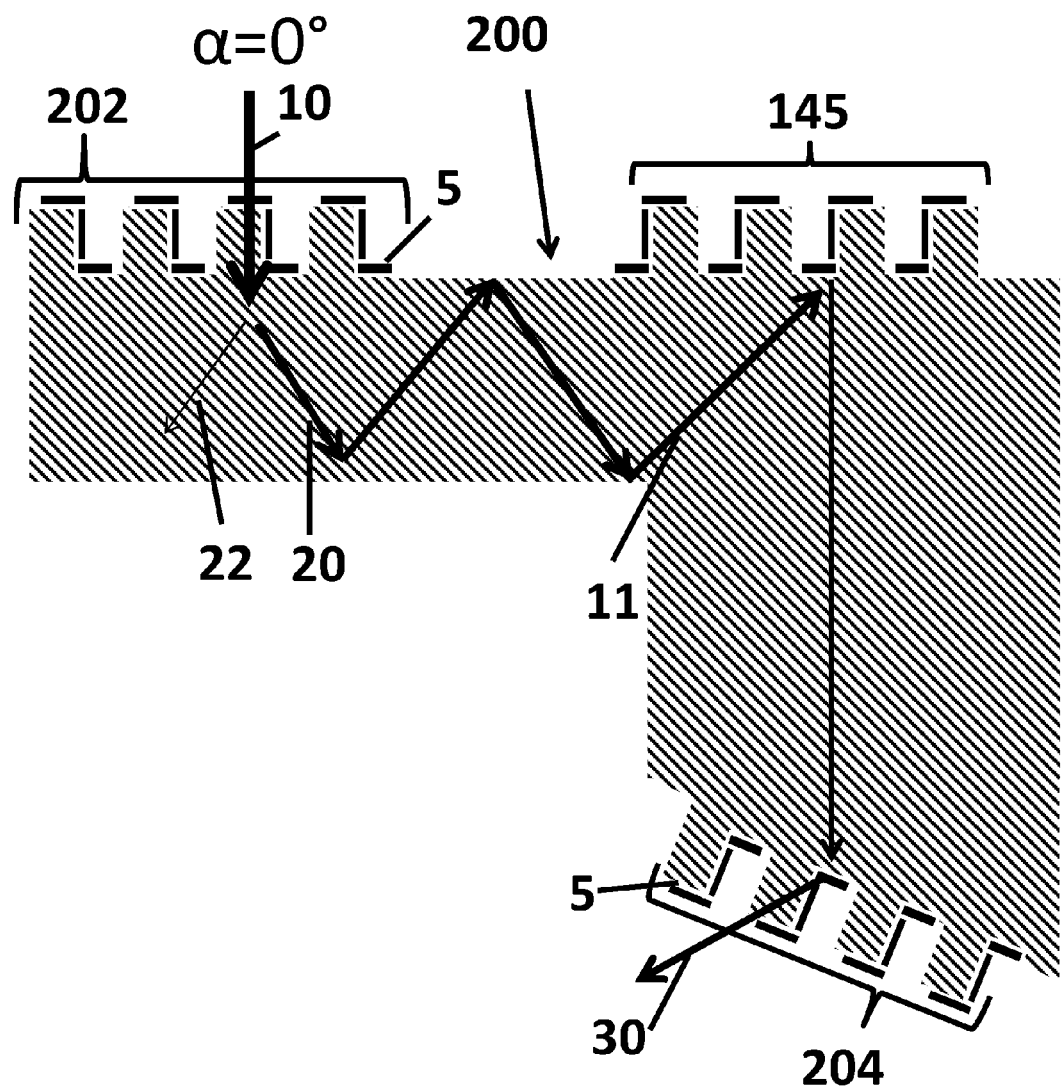
FIG. 11 shows a lightcoupling system comprising two lightguiding portions comprising at least one incoupler and one outcoupler comprising diffraction grating elements on which an asymmetric dielectric coating is arranged.

FIG. 11 shows an exemplary lightcoupling system 200 comprising two portions 202, 204, each portion being a lightcoupling system 200, and in which a grating coupler 145 is arranged to deviate the incident light beam 11 on that grating coupler 145. An exemplary application of a grating coupler 145 in a lightcoupling system 200 is its use as a substitute for a reflecting mirror, with the advantage that no mirror has to be adapted to the lightcoupling system 200, improving as such the mechanical stability of the optical system in which the lightcoupling system 200 is used, but also reducing its cost.

The invention relates further also to a method for optimizing the coupling efficiency of the coupled light by the described grating coupler 1, comprising at least the steps of:
choosing geometry, dimension and materials of the optical substrate 2, the diffraction grating 3 and diffraction grating elements 4;
determining the angle of the incident light onto the diffraction grating 3;
determining the wavelength range of the incident light beam on the grating coupler 1;
determining the desired diffraction order and the angle of the diffracted light incident on the grating coupler 1;
determining the materials of the asymmetrical coating 5;
choosing raw values for a set of parameters for the dielectric coating, said parameters comprising the coverage distribution, deduced by the main evaporation angle of the material to be deposited on the diffraction grating elements, and thickness of the dielectric coating arranged on the diffraction grating elements;
proceeding to an optical coupling simulation step, by using an iteration algorithm, to determine the optimized set of parameters, the simulation step being performed to maximize the coupling efficiency of the incident light beam 10 on said diffraction grating 1, crossing said diffraction grating 3 or reflected off said diffraction grating 3, said step being performed for the first or the second diffractive order of the light beam diffracted by said diffraction grating.

The invention relates further also to a method for diffracting a light beam 10 incident on a diffracting element with a diffraction efficiency higher than 50%, in the visible wavelength range, into one of the positive or negative diffraction orders, and for any incidence angle of said light beam, said diffraction being performed by the grating coupler 1 of the invention, as described before.

Finally, the invention relates to the use of a grating coupler 1 as described in the invention.

The invention claimed is:

1. A grating coupler comprising:
an optical substrate arranged to transfer a light beam, and
a diffraction grating arranged on, or imbedded in, the surface of said optical substrate, said diffraction grating comprising diffraction grating elements arranged substantially in the plane (A) of said diffraction grating, said diffraction grating elements defining for each cross section thereof, a normal (B) to said plane (A), said normal (B) separating said cross section into two substantially symmetrical portions, and said normal (B) further dividing said diffraction grating elements in a first side (FS) and a second side (SS), said first side (FS) being situated substantially in the proceeding direction of the propagating order of the diffracted light beam having the highest intensity, transferred from the diffraction grating, said second side (SS) being oriented opposite to said proceeding direction,
wherein each of said diffraction grating elements comprises at least one coating, said coating being arranged asymmetrically on said diffraction grating elements, and wherein a major portion of said coating is arranged either to said first side (FS), or to said second side (SS), a minor portion of said coating being arranged to said second side (SS) or to said first side (FS) respectively, the major portion and the minor portion being continuous and forming said coating, and
wherein the grating coupler is further arranged to satisfy the condition:

$(n1 \times \sin(|\alpha|) + n2)/\lambda \times P \geq 1$, wherein
n1 is the refractive index of the optical medium to the incident light side of the diffraction grating elements,
n2 is the refractive index of the optical medium to the diffracted light side of the diffraction grating elements,
$|\alpha|$ the absolute value of the incident angle of the light beam incident on the grating coupler,
$\lambda$ is the wavelength of the diffracted light, and
P is the period of the diffraction grating elements,
and wherein said grating coupler has an efficiency substantially higher than 50% into either the first positive diffraction order or the first negative diffraction order.

2. The grating coupler according to claim 1, wherein the coating is a dielectric coating.

3. The grating coupler according to claim 2, wherein the dielectric coating is a multilayer dielectric coating.

4. The grating coupler according to claim 1, wherein materials of said coating are chosen among materials having an index of refraction higher than 1.4 for wavelengths between 0.2 and 2 µm.

5. The grating coupler according to claim 4, wherein the material of the dielectric coating is chosen among the group ZnS, or $TiO_2$, or $HfO_2$, or $Ta_2O_5$, or $ZrO_2$, or AlN, or $Al_2O_3$ or ZnO, or $SiO_2$, or $Si_3N_4$, or $MgF_2$, or $CaF_2$, or MgO, or any combination of these.

6. The grating coupler according to claim 1, wherein said coating is a metallic coating.

7. The grating coupler according to claim 1, wherein said coating is a semiconductor coating.

8. The grating coupler according to claim 1, wherein said coating comprises at least two materials chosen among dielectrics, metals or semiconductors.

9. The grating coupler according to claim 1, wherein said coating comprises a first coating and a second coating each arranged asymmetrically.

10. The grating coupler according to claim 9, wherein a major portion of said first coating and said second coating are respectively arranged on said first side (FS) and on said second (SS) side.

11. The grating coupler according to claim 1, wherein the optical substrate is a waveguide, arranged to guide an incoupled light beam, coupled by said grating coupler, in said waveguide.

12. The grating coupler according to claim 1, wherein the optical substrate material is an optical window, arranged to transfer, through said optical window, an incoupled light beam in said optical window, by said diffraction grating.

13. The grating coupler 1 according to claim 1, wherein the optical substrate material is transparent for wavelengths between 200 nm and 10 µm, preferably between 350 nm and 3 µm.

14. The grating coupler according to claim 1, wherein the diffraction grating elements have a substantially rectangular, triangular, cycloidal, trapezoidal, staircase or semi-circular cross section, said cross section being defined in the direction of the propagating light beam.

15. The grating coupler according to claim 1, wherein the diffraction grating elements have a substantially sinusoidal cross section, said cross section being defined in the direction of the propagating light beam.

16. The grating coupler according to claim 1, wherein the diffraction grating elements are substantially elongated elements distributed periodically in the proceeding direction of a light beam transferred from the diffraction grating.

17. The grating coupler according to claim 16, wherein the diffraction grating elements are binary grating elements.

18. The grating coupler according to claim 1, wherein the diffraction grating elements are distributed in a 2-dimensional array of said diffraction grating elements, arranged in the plane of said diffraction grating.

19. The grating coupler according to claim 1, wherein the diffraction grating elements have refractive and diffractive properties.

20. The grating coupler according to claim 1, wherein the period of the diffraction grating elements is in the order of the wavelength of the incident light beam on said diffraction grating elements, and wherein said diffraction grating elements are arranged to allow substantially only a specific diffraction order in the light interaction with said diffraction grating elements.

21. The grating coupler according to claim 20, wherein said specific diffraction order is the first negative or the first positive diffraction order.

22. The grating coupler according to claim 20, wherein said specific diffraction order is the second negative or the second positive diffraction order.

23. A light coupling system, comprising:
an optical substrate to transfer a light beam,
a grating coupler according to claim 1, arranged on said optical substrate to incouple an incident light beam on said grating coupler into said optical substrate,
a grating coupler according to claim 1, arranged on said optical substrate to outcouple an incident light beam on said grating coupler out of said optical substrate.

24. The light coupling system according to claim 23, wherein the optical substrate is a waveguide or a window.

* * * * *